(12) United States Patent
Wessling et al.

(10) Patent No.: US 10,451,765 B2
(45) Date of Patent: Oct. 22, 2019

(54) POST-WELL RESERVOIR CHARACTERIZATION USING IMAGE-CONSTRAINED INVERSION

(71) Applicants: Stefan Wessling, Hannover (DE); Nicklas Jeremias Ritzmann, Celle (DE); Ulrike Peikert, Celle (DE)

(72) Inventors: Stefan Wessling, Hannover (DE); Nicklas Jeremias Ritzmann, Celle (DE); Ulrike Peikert, Celle (DE)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 40 days.

(21) Appl. No.: 15/586,899

(22) Filed: May 4, 2017

(65) Prior Publication Data
US 2017/0322339 A1    Nov. 9, 2017

Related U.S. Application Data

(60) Provisional application No. 62/333,022, filed on May 6, 2016.

(51) Int. Cl.
*G01V 3/38* (2006.01)
*G01V 3/26* (2006.01)
(Continued)

(52) U.S. Cl.
CPC .................. *G01V 3/38* (2013.01); *E21B 7/04* (2013.01); *E21B 44/005* (2013.01);
(Continued)

(58) Field of Classification Search
CPC ............. E21B 47/02216; E21B 47/026; E21B 49/006; G01V 3/38; G01V 3/26;
(Continued)

(56) References Cited

U.S. PATENT DOCUMENTS

| 2011/0075516 A1 | 3/2011 | Xia et al. |
| 2012/0119744 A1* | 5/2012 | Habashy .................. G01V 3/20 324/339 |

(Continued)

FOREIGN PATENT DOCUMENTS

| WO | 2015051123 A1 | 4/2015 |
| WO | 2015051300 A1 | 4/2015 |
| WO | 2016064483 A1 | 4/2016 |

OTHER PUBLICATIONS

Notification of Transmittal of the International Search Report and The Written Opinion of the International Searching Authority, or the Declaration; International Application PCT/US2017/031180; Filing Date May 5, 2017; dated Aug. 17, 2017; 14 pages.

(Continued)

*Primary Examiner* — Kenneth L Thompson
(74) *Attorney, Agent, or Firm* — Cantor Colburn LLP

(57) ABSTRACT

A method for estimating an inverted parameter of a subsurface formation includes measuring a first parameter of the subsurface formation and measuring a second parameter of the subsurface formation. The method further includes defining one or more inversion constraints using the second parameter and inverting with a processor the first parameter to generate the inverted parameter of the subsurface formation using the one or more inversion constraints.

20 Claims, 28 Drawing Sheets

(51) Int. Cl.
*E21B 47/0228* (2012.01)
*E21B 47/026* (2006.01)
*E21B 7/04* (2006.01)
*E21B 44/00* (2006.01)
*E21B 47/00* (2012.01)
*E21B 49/00* (2006.01)
*G01V 3/30* (2006.01)
*G01V 11/00* (2006.01)

(52) U.S. Cl.
CPC .......... *E21B 47/0002* (2013.01); *E21B 49/00* (2013.01); *E21B 49/003* (2013.01); *G01V 3/26* (2013.01); *G01V 3/30* (2013.01); *G01V 11/00* (2013.01)

(58) Field of Classification Search
CPC . G01V 3/30; G01V 11/00; G01V 1/50; G01V 1/48
USPC .............................. 175/50; 166/254.2, 250.2
See application file for complete search history.

(56) References Cited

U.S. PATENT DOCUMENTS

| | | | | |
|---|---|---|---|---|
| 2013/0073206 A1* | 3/2013 | Hou | ........................ | G01V 3/28 |
| | | | | 702/7 |
| 2013/0085731 A1* | 4/2013 | De Stefano | ............ | G01V 3/081 |
| | | | | 703/6 |
| 2013/0226461 A1* | 8/2013 | Yu | ............................ | G01V 3/24 |
| | | | | 702/9 |
| 2014/0200814 A1 | 7/2014 | Guillaume et al. | | |
| 2014/0288834 A1* | 9/2014 | Itskovich | .................. | G01V 3/38 |
| | | | | 702/11 |
| 2014/0350858 A1* | 11/2014 | Donderici | .................. | E21B 7/04 |
| | | | | 702/7 |
| 2015/0369940 A1* | 12/2015 | Wiik | ......................... | G01V 3/08 |
| | | | | 702/7 |
| 2016/0178785 A1* | 6/2016 | Wilson | .................... | G01V 3/265 |
| | | | | 324/324 |
| 2016/0178787 A1* | 6/2016 | Le | ............................ | G01V 3/28 |
| | | | | 702/7 |
| 2016/0245952 A1* | 8/2016 | Dupuis | ..................... | G01V 3/18 |
| 2016/0369626 A1* | 12/2016 | Donderici | .............. | E21B 49/00 |
| 2017/0075021 A1* | 3/2017 | Thiel | ........................ | G01V 3/38 |
| 2017/0306701 A1* | 10/2017 | Wu | ........................ | E21B 47/022 |
| 2017/0343696 A1* | 11/2017 | Tang | ......................... | G01V 3/38 |
| 2018/0003853 A1* | 1/2018 | Ewe | ......................... | G01V 3/28 |
| 2018/0306942 A1* | 10/2018 | Tang | ......................... | G01V 3/18 |
| 2018/0321415 A1* | 11/2018 | Thiel | ........................ | G01V 3/38 |
| 2018/0328793 A1* | 11/2018 | Donderici | .............. | G01K 11/32 |

OTHER PUBLICATIONS

Peikert, et al.; "Improved Post-Well Reservoir Characterization Using Image-Constrained Resistivity Inversion-An Example from HA/HZ Well in Channelized Sand"; SPWLA 57th Annual Logging Symposium; Jun. 25-29, 2016; 15 pages.

Valdisturlo, A.; et al.; "Improved Petrophysical Analysis in Horizontal Wells: From Log Modeling Through Formation Evaluation to Reducing Model Uncertainty-A Case Study"; SPE164881; (2013); 13 pages.

* cited by examiner

POST-WELL RESERVOIR CHARACTERIZATION USING IMAGE-CONSTRAINED INVERSION

CROSS REFERENCE TO RELATED APPLICATION

This application claims the benefit of an earlier filing date from U.S. Provisional Application Ser. No. 62/333,022 filed May 6, 2016, the entire disclosure of which is incorporated herein by reference.

BACKGROUND

It would be well received in the hydrocarbon production industry if the accuracy of models of earth formations would be improved.

BRIEF SUMMARY

Disclosed in a method for estimating an inverted parameter of a subsurface formation. The method includes: measuring a first parameter of the subsurface formation; measuring a second parameter of the subsurface formation; defining one or more inversion constraints using the second parameter; and inverting with a processor the first parameter to generate the inverted parameter of the subsurface formation using the one or more inversion constraints.

Also disclosed is an apparatus for estimating an inverted parameter of a subsurface formation. The apparatus includes: a first tool configured to measure a first parameter of the subsurface formation; a second tool configured to measure a second parameter of the subsurface formation; and a processor configured to invert, using one or more inversion constraints relate to the second parameter, the first parameter to generate the inverted parameter of the subsurface formation.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
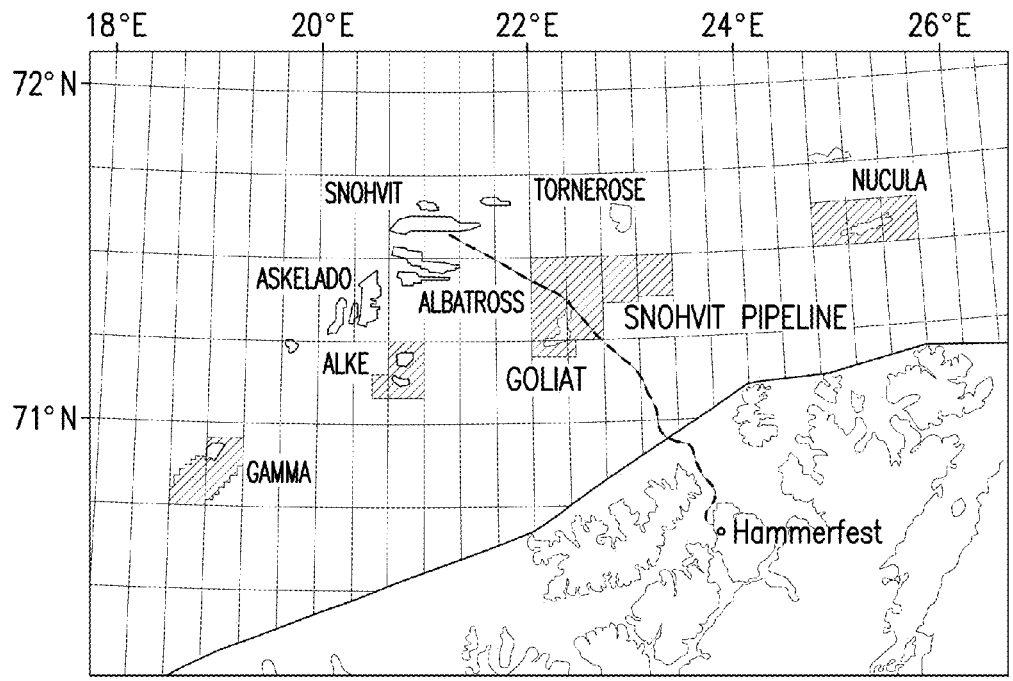
FIG. 1 illustrates location of the Goliat field in the Arctic Barents Sea.

A detailed description of one or more embodiments of the disclosed apparatus and method presented herein by way of exemplification and not limitation with reference to the figures.

Disclosed are embodiments of methods for providing models (i.e., mathematical models or virtual models) of an earth formation that have improved accuracy over the prior art. The improved models are obtained using novel inversion methods. While the inversion methods discussed herein relate to resistivity measurements or resistivity logging, the methods disclosed herein can relate to other forms of logging such acoustic logging, nuclear magnetic resonance logging or neutron logging as non-limiting examples. Using the improved models, the accuracy of petro-physical interpretation and/or analysis is also improved. Petro-physical interpretation and/or analysis of the earth formation may provide estimates of certain parameters that are used for completion planning and executing the corresponding plans. Non-limiting embodiments of these parameters include saturation and an amount of hydrocarbon reserves. Non-limiting embodiments of completion planning include design of completion string to include placement of inflow control devices to optimize or improve efficiency of production, placement of packers, location of perforations in the well, and planning and drilling new wells (to include determining location and geometry or trajectory of the new wells). In general, these actions are performed using apparatus already known in the art.

Overview of Disclosure

Formation evaluation in high-angle/horizontal (HAHz) wells is particularly challenging in complex reservoirs such as channelized sands. Data acquired in such context cannot be fully representative of the reservoir physical properties if the reservoir architecture is not properly considered in forward modeling and inversion. Forward modeling means the process of algorithmic generation of synthetic data that would be measured for a given earth model. This takes physical principles and geometric considerations into account. Inversion describes the reciprocal problem, resolving plausible model parameters from measured data. This is an iterative process, needs to be solved by an algorithm and each inversion needs to solve the forward problem as well, in order to optimize the solution and minimize the error between measured and synthetic data.

This disclosure presents a case study from a channelized sand reservoir where a combined interpretation of LWD images and resistivity inversion delivered corrected formation resistivity values for a water saturation estimate. Formation evaluation data from different logging-while-drilling (LWD) tools were used to land a horizontal well in the channelized sand reservoir (Barents Sea). The inversion of resistivity data was performed to obtain a real-time reservoir model and to support steering decisions. The real-time inversion results were then improved in a post-well analysis using memory data with higher resolution. It should be understood that within the scope and the spirit of this disclosure, a real-time activity includes all operations that allow corrective actions to the drilling process. Such real-time activities are also known in the industry as while-drilling operations or operations while a well is being drilled and include also phases where the actual drilling process is paused for operational reasons such as phases when the drill string is tripped into, within, or out of the borehole, or phases when the drilling process is paused, for instance when drill pipes are added and connected to the drill string that is already located downhole. Inversion intervals with poor data match were re-processed, enabling assessment according to quality control knowledge. An additional benefit from LWD resistivity memory data is that more components are available, facilitating a more substantiated evaluation of formation properties. The inversion process includes constraints from image interpretation: formation dips, interpreted from borehole images at best resolution, were used to limit the inversion parameters and improve the underlying earth model for saturation estimates. In a further step, the entire reservoir architecture was used to constrain the inversion process in structurally complex intervals. Constrained inversion delivered a geologically sound model of the formation resistivity, wherein bedding structures are better resolved when compared to unconstrained inversion.

Post-well analysis of this dataset also includes different inversion options like interval lengths and automation settings. The results of the different approaches will be discussed in detail, including the final resistivity map for parts of the channelized sand reservoir. Analysis of differences between synthetic and measured data and the integration with other well data such as borehole images was utilized to refine the underlying earth model in challenging intervals. The final target was to obtain a representative model of the reservoir physical properties, allowing a robust and consistent reservoir characterization.

Introduction

Resistivity inversion has been widely used in geosteering/reservoir navigation applications throughout the last decades. LWD induction tools with various frequencies and transmitter-receiver arrangements generate a wide range of measurement curves. Early technology developments detected nearby bed or fluid boundaries; current technologies can detect boundaries up to 30 m away from the wellbore, depending on the resistivity contrast. The main focus of these deep-reading measurements is landing the well in the target zone and maximizing reservoir exposure through real-time analysis. Because of their large depth of detection, as a result of relatively low excitation frequencies, acquired resistivity logs show minor effects on small scale-heterogeneities such as shale-sand interlayered formations or thinly laminated sand bodies.

In contrast, shallow-reading, multi-propagation resistivity logs in structurally heterogeneous reservoirs with large resistivity variations are largely affected by geological and geometric effects. These effects include local layering or resistivity anisotropy, boundary influences such as shoulder-bed effects, proximity effects generated by stacked bed geometry and, finally, polarization horns. From a petro-physical perspective, all these situations complicate the evaluation of water and hydrocarbon saturations from resistivity; hence, correction algorithms and methods are essential for accurate saturation estimates.

Early algorithm developments include a deconvolution technique routinely used to determine resistivities at fixed depths of investigation (DOI), which are limited in high-angle/horizontal wells. Among others, one reason for the limitation is the assumption that fixed DOIs reveal information about invasion effects on the resistivity readings as commonly used for wireline logs and in vertical or near-vertical wells.

In HAHz wells, resistivity differences at various DOIs may not necessarily originate from invasion but rather be caused by different layers which contribute to the resistivity tool response. Therefore, advanced algorithms are needed to determine a geological model that best explains all data acquired in HAHz wells, such as forward modeling and inversion approaches which model the synthetic MPR/APR tool response for a digital earth model. The earth model is then either manually (forward modeling) or automatically (inversion) adjusted until synthetic and measured resistivities coincide. The resulting earth model then represents an accurate, quantitative true formation resistivity (horizontal and vertical resistivity: Rh, Rv) presuming that a sufficiently good fit is obtained.

If azimuthal propagation resistivity measurements are available, inversion algorithms can be used for a better estimation of resistivity anisotropy (Rv and Rh), dip and azimuth angles. For such an evaluation, tool memory data (or wired pipe technology) are highly preferred.

This disclosure presents a case study of a structurally complex channelized sand reservoir, where an MPR/APR inversion approach was used to derive Rh and Rv for formation evaluation purposes. Results from various utilizations of the inversion approach are presented in combination with water/hydrocarbon saturation estimates to highlight possibilities and limitations of the approach. After a description of the geological setting and introduction of the inversion scheme, results from manual and image-constrained inversion are described.

Geological Setting and Reservoir Navigation

Goliat is an Eni Norge operated oil field located in the Arctic Barents Sea as illustrated in FIG. 1. While data from the Goliat field is used in support of the teachings disclosed herein, it is to be understood that the methods disclosed herein are not restricted to this particular field or type of field, but are applicable to other hydrocarbon fields or other types of hydrocarbon fields in other locations throughout the earth.

Figure 2:
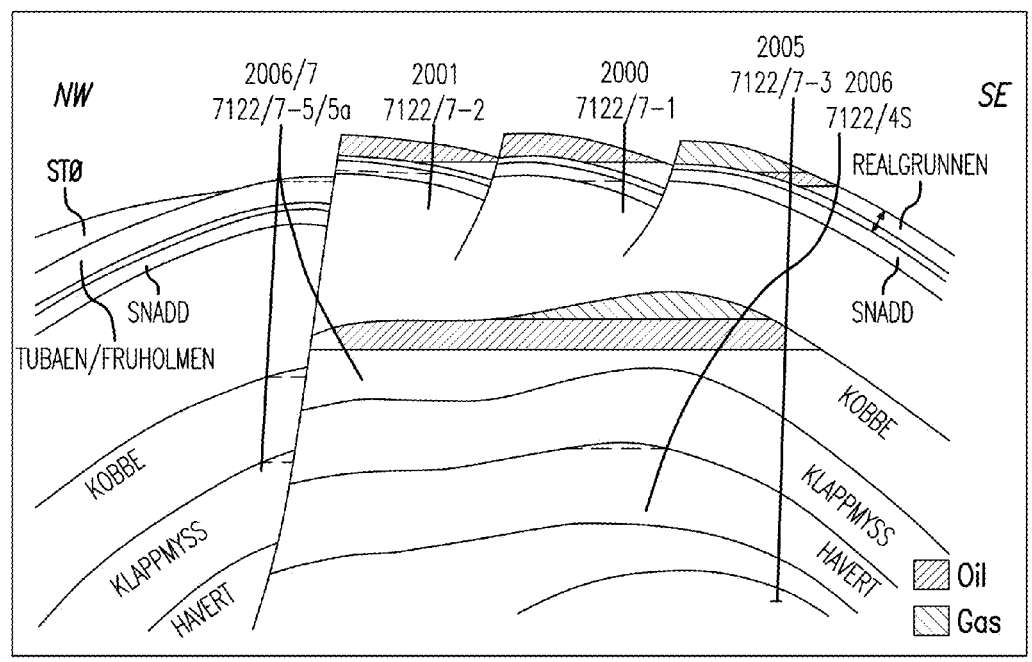
FIG. 2 is an overview of Goliat's geological setting and reservoir units.

The reservoirs are in a complex structural setting characterized by a large number of faults and a relative high structural dip towards the flank of the structure. Two major reservoir units are of economic interest and are included in the ongoing field development (FIG. 2). The upper unit (Realgrunnen Group) is represented by a fluvial-deltaic system with channel- (partially with tidal influence), overbank-deposits and floodplains passing upward to a higher energy fluvial environment, which comprises alluvial fan and channel deposits. The lower unit (Kobbe Formation) is divided into two main subgroups; the upper one represents a prograding deltaic system with mouth bars and a tidal influenced system. In the lower subgroup, the system moves into a heterogeneous fluvial setting with limited lateral sand-body continuity.

The complex geological and structural setting of the field calls for horizontal production wells to achieve effective drainage. The development plan foresees 12 horizontal production wells, each dedicated to a single reservoir unit. Gas and water injectors are planned for pressure support.

The requirements for maximum reservoir exposure in the horizontal reservoir section led to the use of extra-deep azimuthal resistivity (EDAR) technology to gather the maximum information about the reservoir architecture. In this disclosure, one of the drilled wells is chosen as an example to present the results of the methodology disclosed. The goal of this well was to drain the upper reservoir unit within the selected segment. The target formation is constituted by a 25 to 30 m thick sand body, identified by its correlation to offset wells and described as channel deposits. The horizontal section of the well is placed at an optimized depth with regard to fluid contact position.

Figure 3:
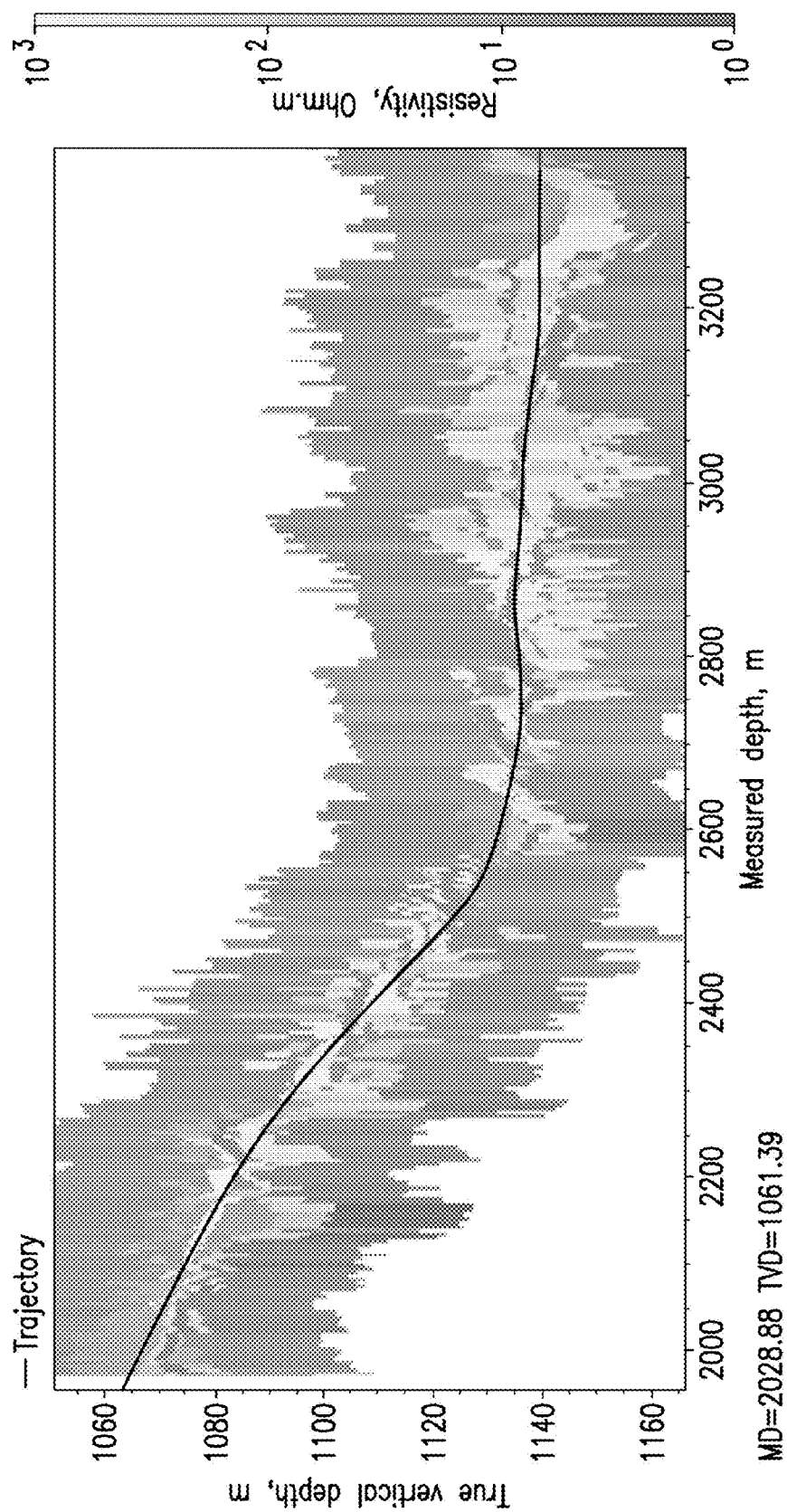
FIG. 3 depicts aspects of a drilled example well on Goliat (the wellbore is indicated by black line, while the inversions' shaded bars are shade-coded based on the scale to the right; generally, brighter shades indicate higher resistivities)

The example well was drilled with EDAR, MPR and APR technology where real-time interpretation of the data was used to land the well after a main fault and thereafter, navigating for maximum reservoir exposure in a channelized sand formation. Inversion results were used to map the top of the reservoir, to avoid unwanted long sections in shale and to determine structural dips. The well path was adjusted according to the inversion interpretation results. FIG. 3 provides insight into resistivity mapping results from reservoir navigation. The results were obtained using a 4-layer inversion setup. We concentrated on the gathered MPR/APR data, i.e. frequencies of 400 kHz and 2 MHz, excluding the additional extra-deep resistivity data used in real-time operation.

Methodology

One-dimensional (1D) processing software was developed and used for real-time and post-well applications, enabling the user to analyze any combination of omnidirectional, azimuthal and extra-deep resistivity measurements for an arbitrarily layered earth model. The inversion algorithm is modeled after the method of the most-probable parameter combination, which is a combination of Tikhonov's regularization and the method of Kalman's filter.

Data are inverted in 1D intervals, giving a 1.5D model after combining individual sequences. Real-time requirements necessitate interpretations be performed on a relatively large scale, with inversion intervals of 5 or 10 meter (m) lengths. Detailed memory analysis can be used to refine the model to interval lengths of 1 or 2 m. Further petrophysical analysis also requires a higher resolution for Rv/Rh to make saturation estimates.

Figure 4:
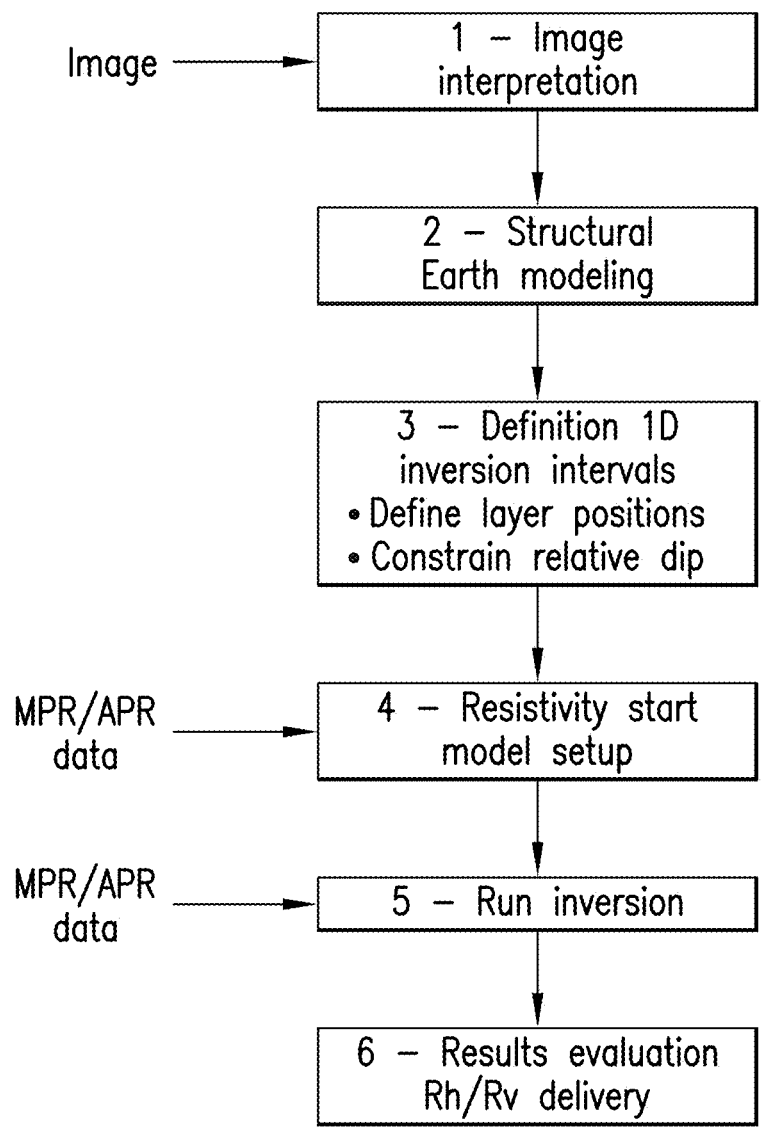
FIG. 4 is a workflow used to run image-constrained inversion.

Various degrees of freedom can be presumed for the inversion scheme, depending on the availability of information to constrain the underlying earth model. Of course, a reduction in ambiguity of the inversion results is achieved by constraining the underlying model as much as possible, ideally in a way that the algorithm only inverts for Rv and Rh. FIG. 4 presents a general workflow.

Figure 24:
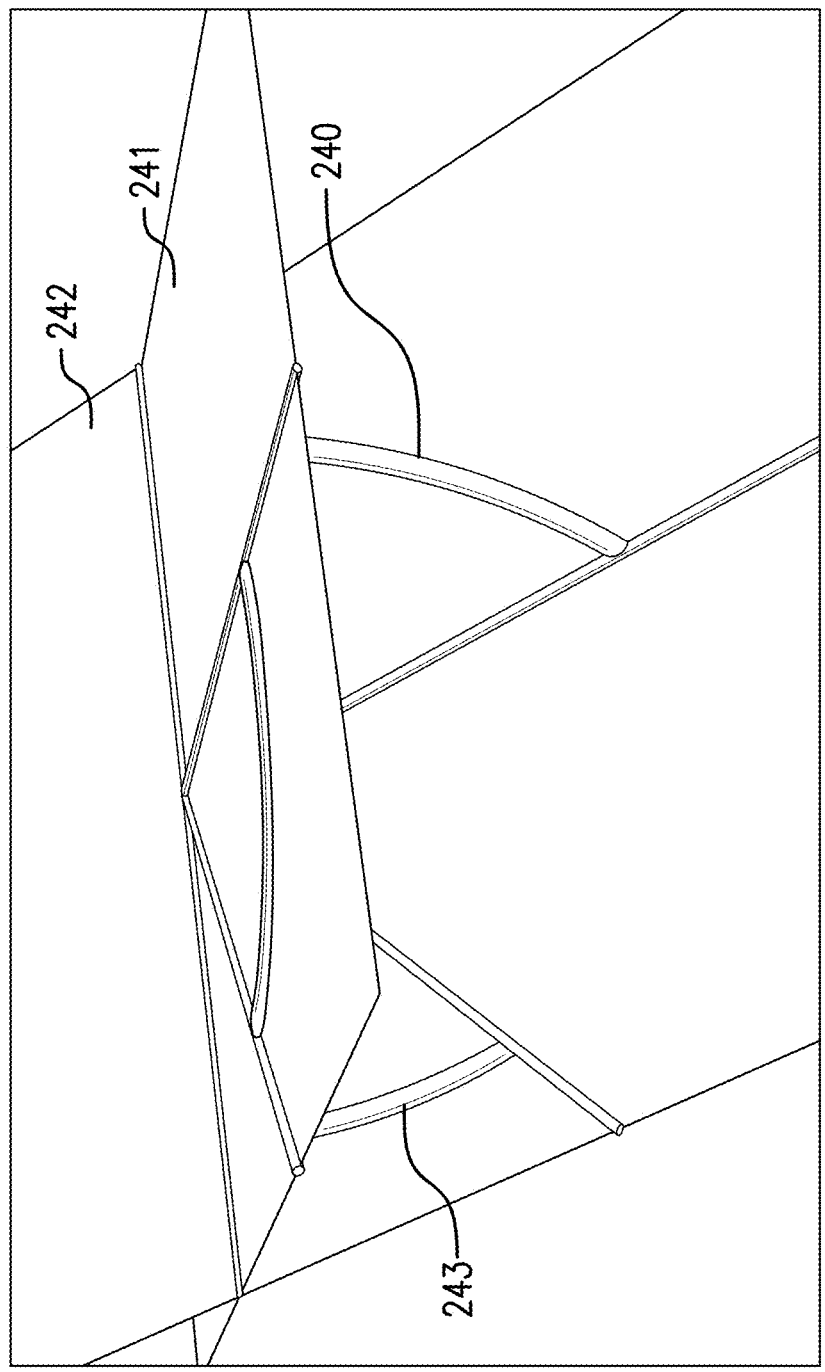
FIG. 24 depicts aspects of true dip between a horizontal plane and a boundary plane.
Figure 25:
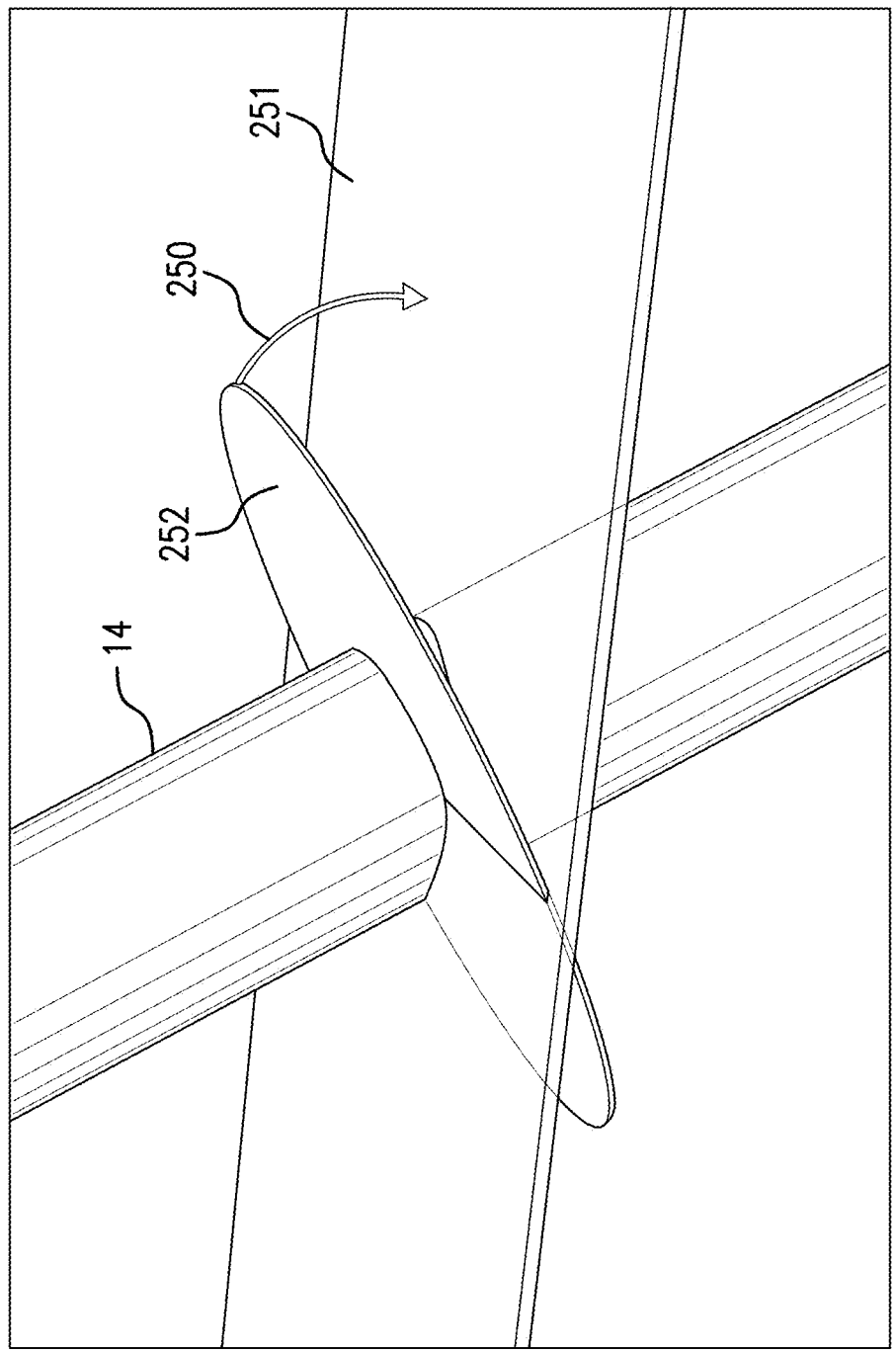
FIG. 25 depicts aspects of relative dip between a formation plane and a plane orthogonal to a wellbore.

The first steps of the workflow include the processing and interpretation of a borehole image. The image may be acquired while drilling or by a tool that is disposed downhole after the borehole has been drilled. Various tools to acquire images of the borehole or the formation surrounding the borehole are known in the industry and can be used for the purpose of this invention such as an electric imaging tool, a resistivity imaging tool, a conductivity imaging tool, a permittivity imaging tool, a gamma radiation imaging tool, a density imaging tool, a porosity imaging tool, and an acoustic imaging tool, such as an acoustic deep compressional or shear wave imaging tool. For example, such imaging tools may be used to measure the dip between the borehole and a geological feature of the subsurface formation, a bed boundary in the subsurface formation, or a fluid contact in the subsurface formation. In one or more embodiments, a dipmeter may be also used to measure the dip between the borehole and a geological feature of the subsurface formation, a bed boundary in the subsurface formation, or a fluid contact in the subsurface formation. The dipmeter measurements or images can also be used to identify geological structures according to stratification (block 1 in FIG. 4). Alternatively, geological structures and their corresponding orientations may be extracted from other geophysical measurements such as but not limited to seismic surveys, and acoustic shear images. Such measurement may be used to derive geomodels that can also be used to derive geological structures and their corresponding structures from. Dips and/or bed boundaries are then used to create a structural earth model (block 2). It is well appreciated that different nomenclatures for dips exist in the industry. Here, the following description is used as illustrated in FIGS. 24 and 25. True dip is the maximum angle (see arc 240 in FIG. 24) between horizontal plane 241 and the boundary plane 242. All other angles between these two planes are apparent dips (e.g. arc 243). The relative dip of a formation plane is a maximum angle 250 between formation plane 251 and orthogonal plane 252 that is perpendicular to the wellbore 14 as illustrated in FIG. 25. This angle can be calculated from an image log using measurements of the amplitude and trough azimuth of an interpreted feature in or on the wellbore wall, and wellbore diameter. For that purpose, it is common to fit the feature that is identified on the image by a sinusoid. Alternatively, these angles can be calculated by using other geophysical measurement tools such as but not limited to dipmeter, acoustic shear images, seismic surveys or extracted from existing geomodels.

The next step covers the definition and setup of the inversion scheme (block 3 in FIG. 4). In addition to setting mathematical parameters (such as acceptance criteria, the amount of iterations etc.), 1D inversion intervals are mapped on top of the earth model, so that the positions of bed boundaries can be defined accordingly. Finally, 1D intervals are cut (defined infinite) beyond the maximum depth of investigation (DOI) of the MPR/APR tools.

Figure 5:
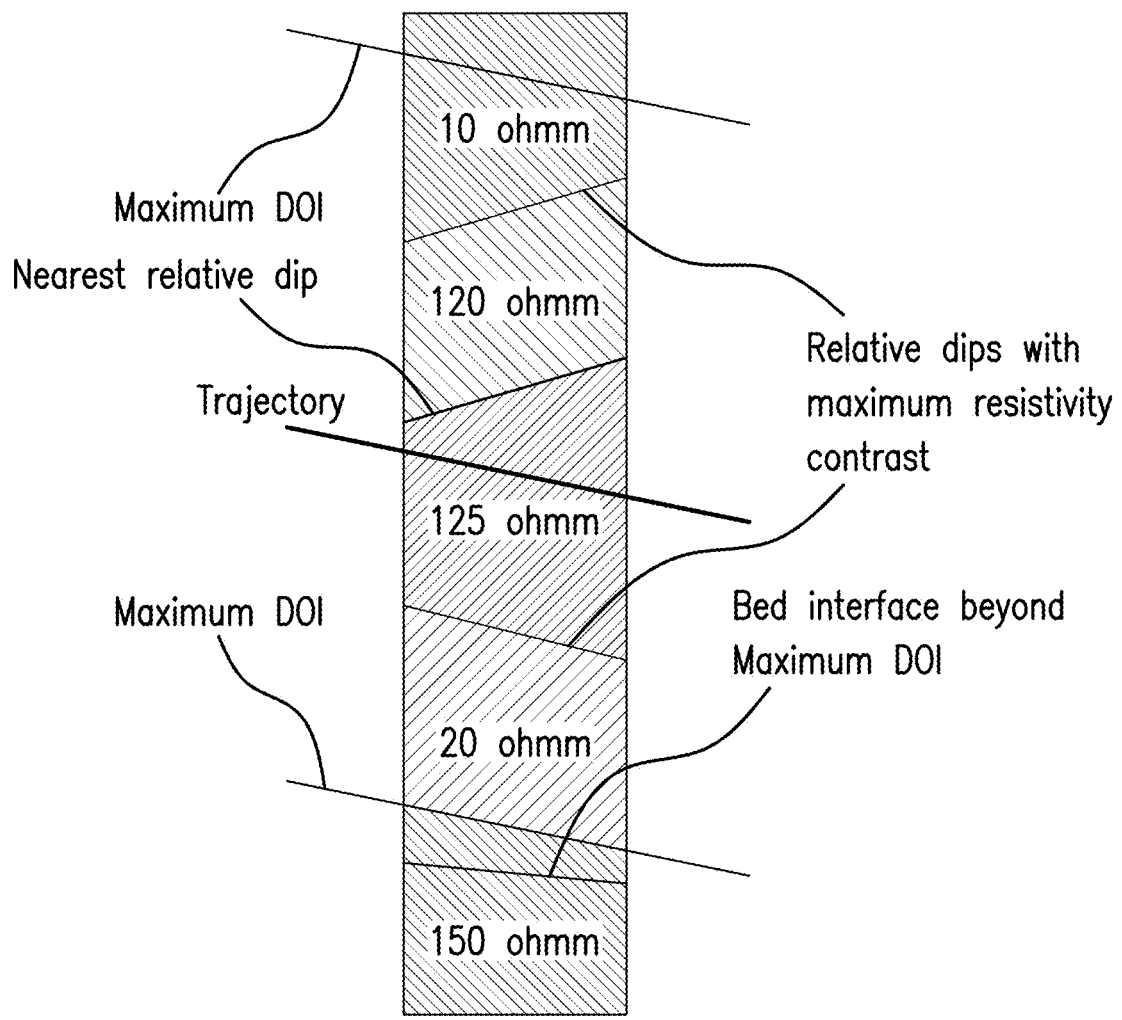
FIG. 5 illustrates the influence of relative dips on one-dimension inversion.
Figure 6A:
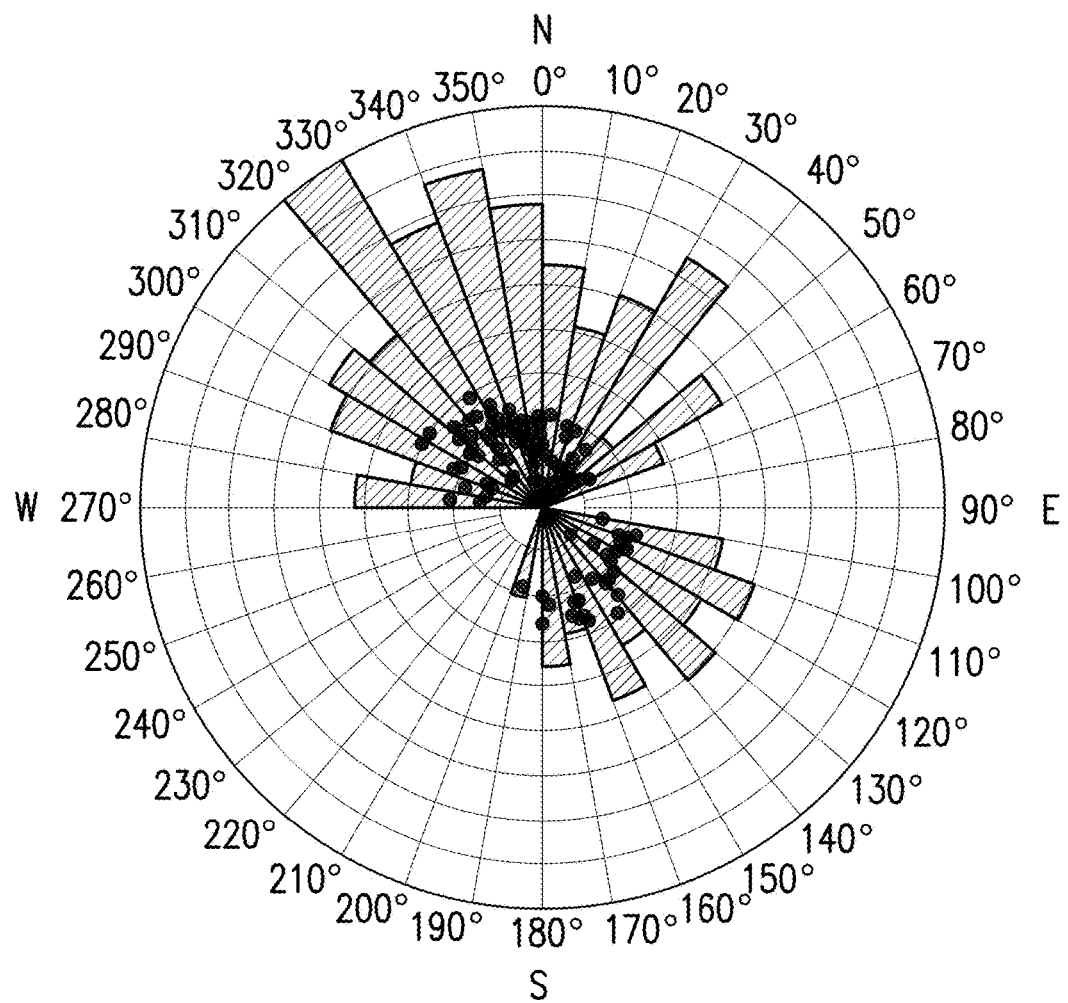
FIGS. 6A-6D, collectively referred to as FIG. 6, illustrate a comparison of dips from short-spaced (2.5 in. DOI) and long-spaced (3.5 in. DOI) density image.
Figure 6B:
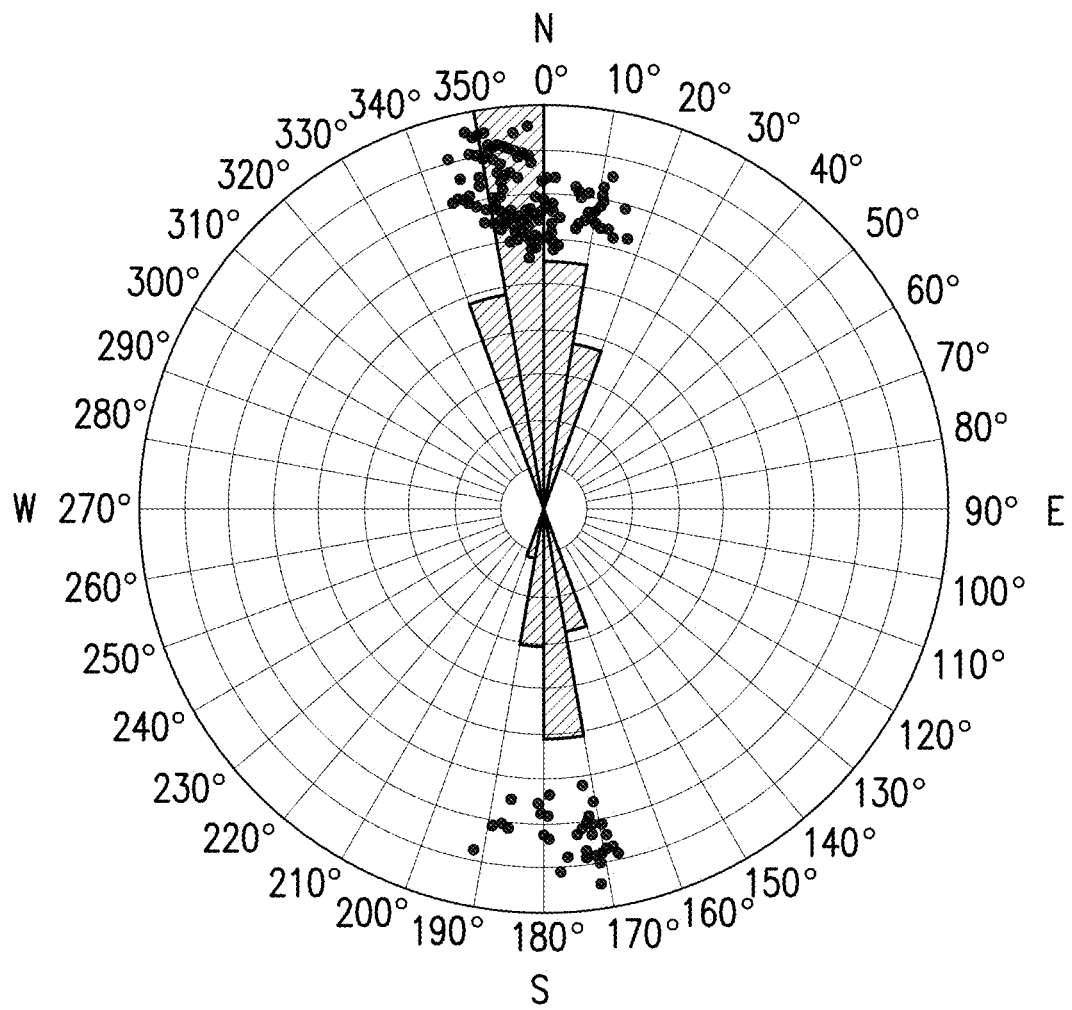
Figure 6C:
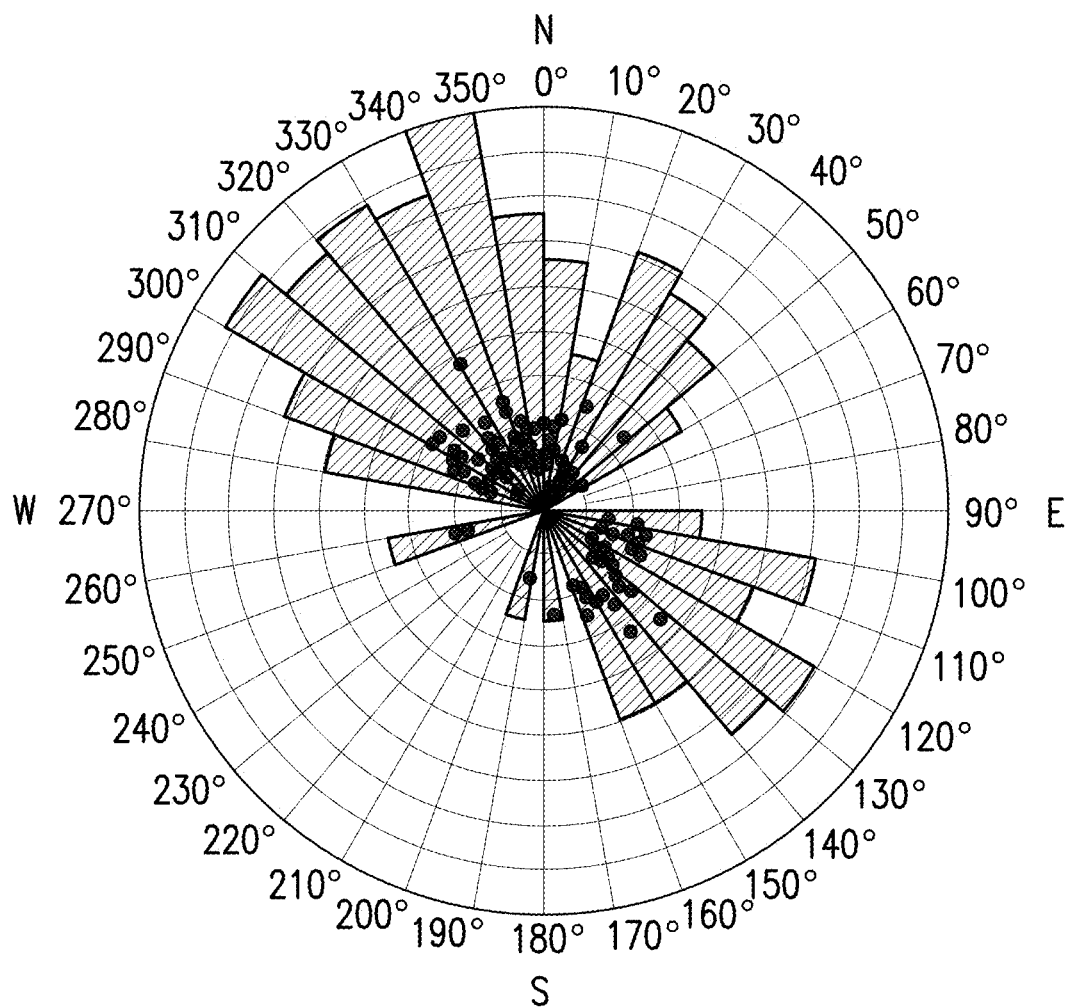
Figure 6D:
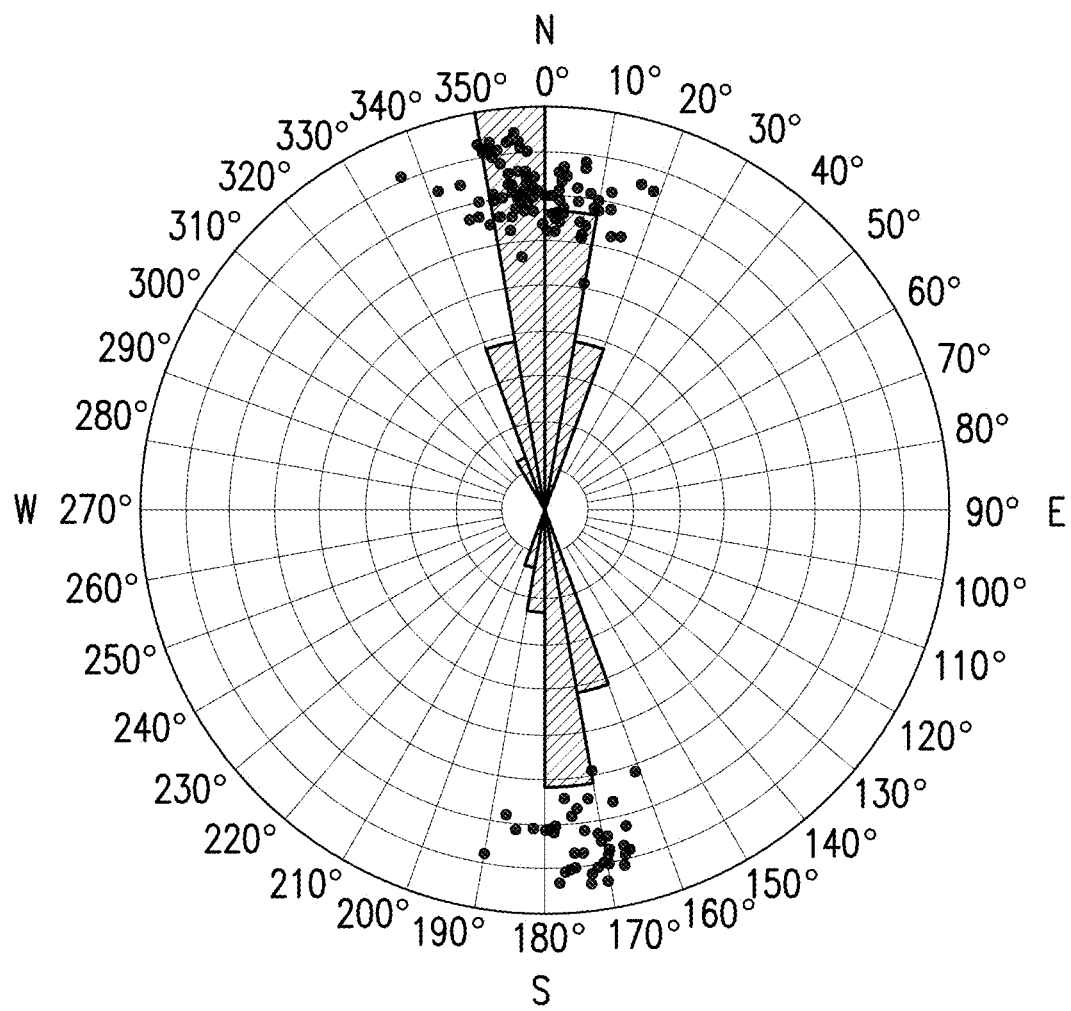

The relative dip either is left unconstrained or was constrained in a way to cover the range between the maximum and minimum angle imposed by the structural earth model within the specific 1D intervals. The range of relative dips may vary depending on the geological situation, such as cross-beddings. Furthermore, as far as the relative dips are concerned, the MPR/APR signal response is controlled by a combination of the dip between layers of maximum resistivity contrast and the distance of a bed boundary and the sensors (FIG. 5).

The last step to prepare for inversion is the definition of a resistivity start model (block 4 in FIG. 4). Various resistivity logs are assigned to the structural earth model as initial start values. In one approach, the resistivity from unconstrained inversion was used as a start value for constrained inversion.

After running the inversion (block 5), the results are evaluated with respect to consistency with the earth model, misfit and Rh along the well trajectory (block 6).

For this case study, various inversion setups are used to constrain the inversion. In a first setup, a semi-automated inversion scheme was used in which the algorithm finds Rv and Rh over a wider range of layer positions, the relative dip(s) of these layers and the resistivities of these layers. In addition, relative dips as a result of APR inversion are compared against dips picked from a short- and long-spaced density image (16 sectors resolution) as a quality indicator of the inversion results. Another quality indicator is the misfit between the synthetic data and the measurements. Synthetic data are obtained from the inversion and the misfit is determined as the root-means-square normalized difference between synthetic data and measurements. A good misfit does not necessarily indicate a geologically sound inversion result, but rather represents a mathematically optimized solution.

In a second setup, the relative dip from an image interpretation nearest to the well trajectory is used to constrain the inversion. The amount of layers is pre-defined for each 1D interval to either four or six layers.

In a third scheme, the inversion is constrained by a structural earth model and the inversion is only applied to find Rv, Rh and relative dips. The relative dip was given a start value but is left unconstrained for inversion.

With the results from unconstrained inversion along an elongated interval, two smaller intervals with higher structural complexity were selected to apply constrained inversion. The results of the intervals were then compared against the unconstrained ones to evaluate the inversion effect.

Results

After a brief introduction of the image interpretation results from the short- and long-spaced density image, formation resistivity results from the unconstrained and image-constrained inversion are described. The various resistivity inversion results were then used to estimate saturation along the well trajectory. A saturation comparison thus follows the inversion results description.

Image Interpretation is now discussed. In heterogeneous stratigraphic as well as structurally influenced intervals, precise knowledge of what to expect is beneficial before setting up a geologic start model for the 1D inversion. This information can be derived from borehole images and considered ground truth for a "near-wellbore" geological model.

The logging while drilling (LWD) image logging suite in this particular job includes gamma ray (GR), density and stand-off (caliper) images. Whereas GR and density images contain mostly information about the lithology, the majority of the information held by the stand-off image is the borehole shape and therefore not a preferred image for dip picking. The GR image divides the borehole into 8 sectors and has a vertical resolution of 16 in. The density sensor records two images: a short-spaced (SS) and long-spaced image (LS). Both images divide the borehole into 16 sectors. The short-spaced image has a higher vertical resolution (8 in.) at a shallower DOI compared to the long-spaced image (16 in. at a deeper depth of investigation). A comparison of dips picked from short- and long-spaced density images (FIG. 6) reveals that the standard DOI of 2.5 in. and 3.5 in. for short- and long-spaced sensors is appropriate for image DOI correction processing.

Figure 7:
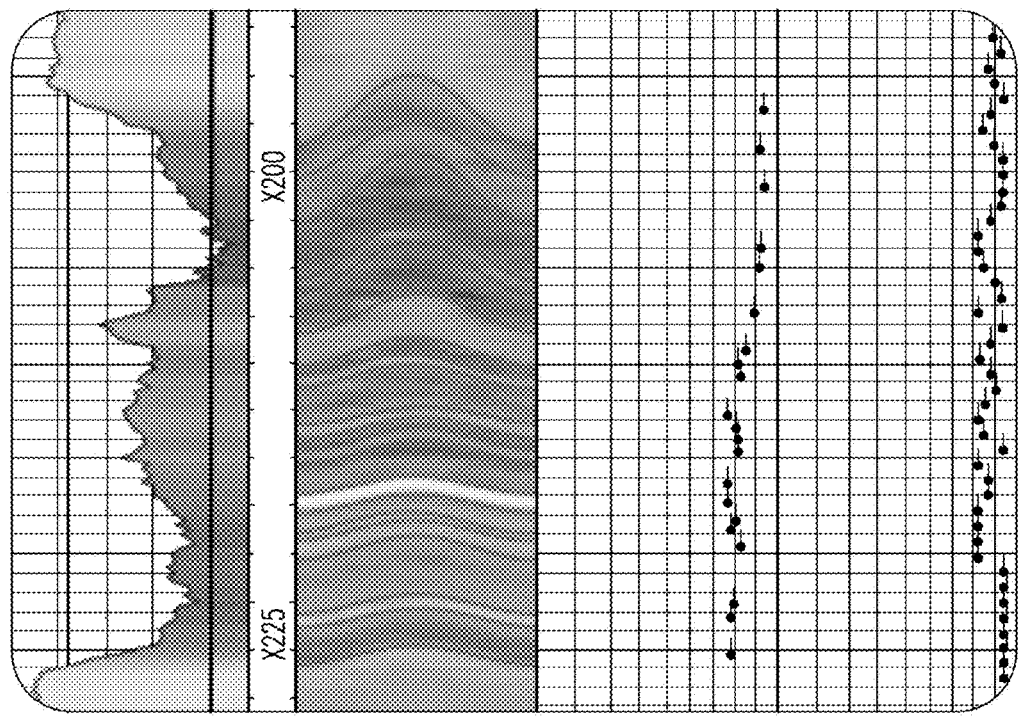
FIG. 7 depicts aspects of an interval illustrating image interpretation and dip orientations of layers (right track: dips picked by the inversion scheme; second track from right: image interpretation results)
Figure 7:
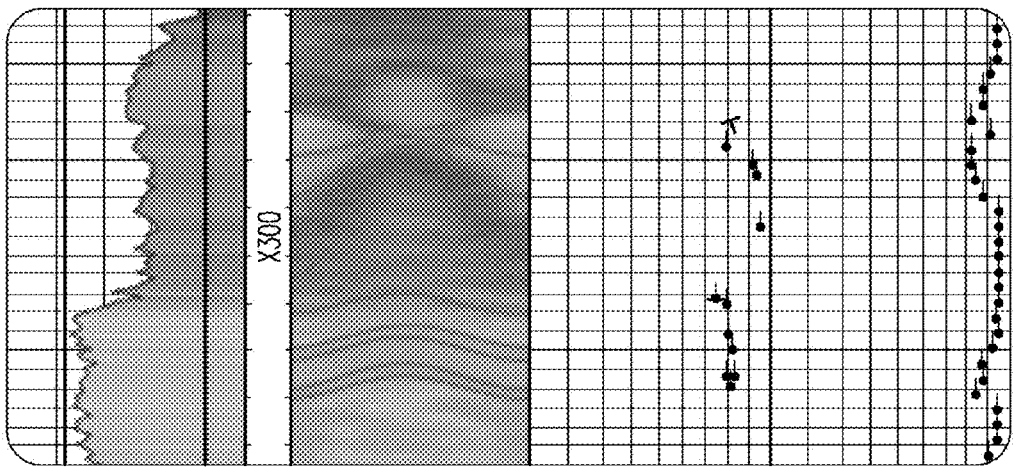
Figure 8:
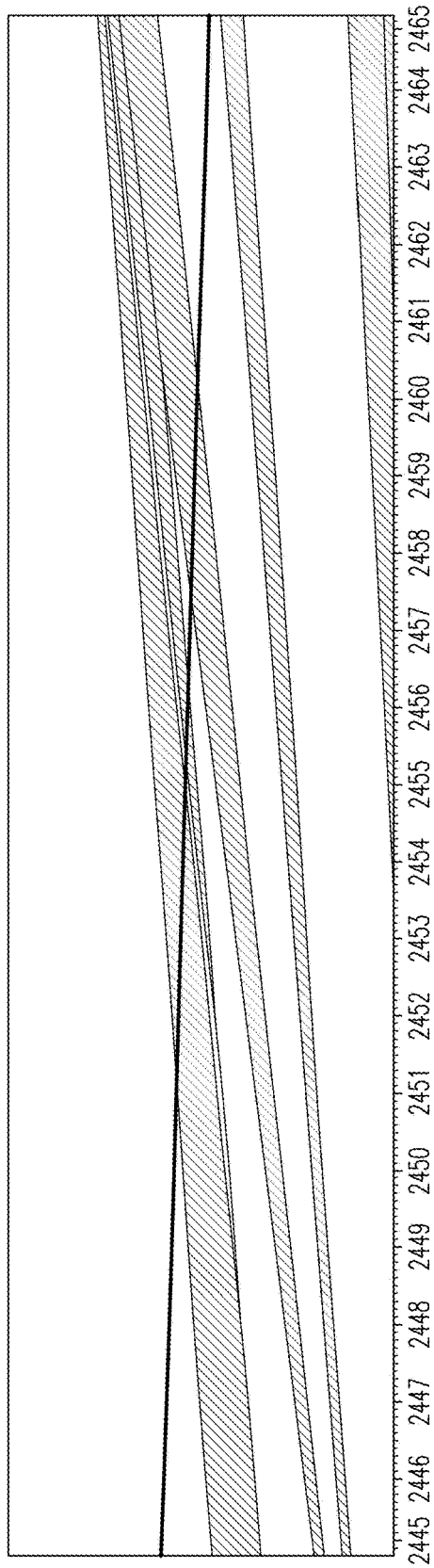
FIG. 8 depicts aspects of an image-based "near-wellbore" model.

The higher horizontal resolution (8 versus 16 sectors) compared to the GR image and higher vertical resolution of the SS density image led to the decision that the dips were preferentially picked from the short-spaced image. The images were processed using in-house image processing software and interpreted with standard oilfield borehole image dip interpretation software (FIG. 7 shows an illustration of dip interpretation results). Utilizing the capability of borehole images to detect the bed boundaries more accurately than conventional logs, the well was divided into geological layers, of which each has its own dip, azimuth and bedding type. These bed characteristics were then used as ground truth to construct a highly detailed, "near-wellbore" geological model as a precise start input for the 1D inversion. FIG. 8 shows a short interval of this model.

Figure 9:
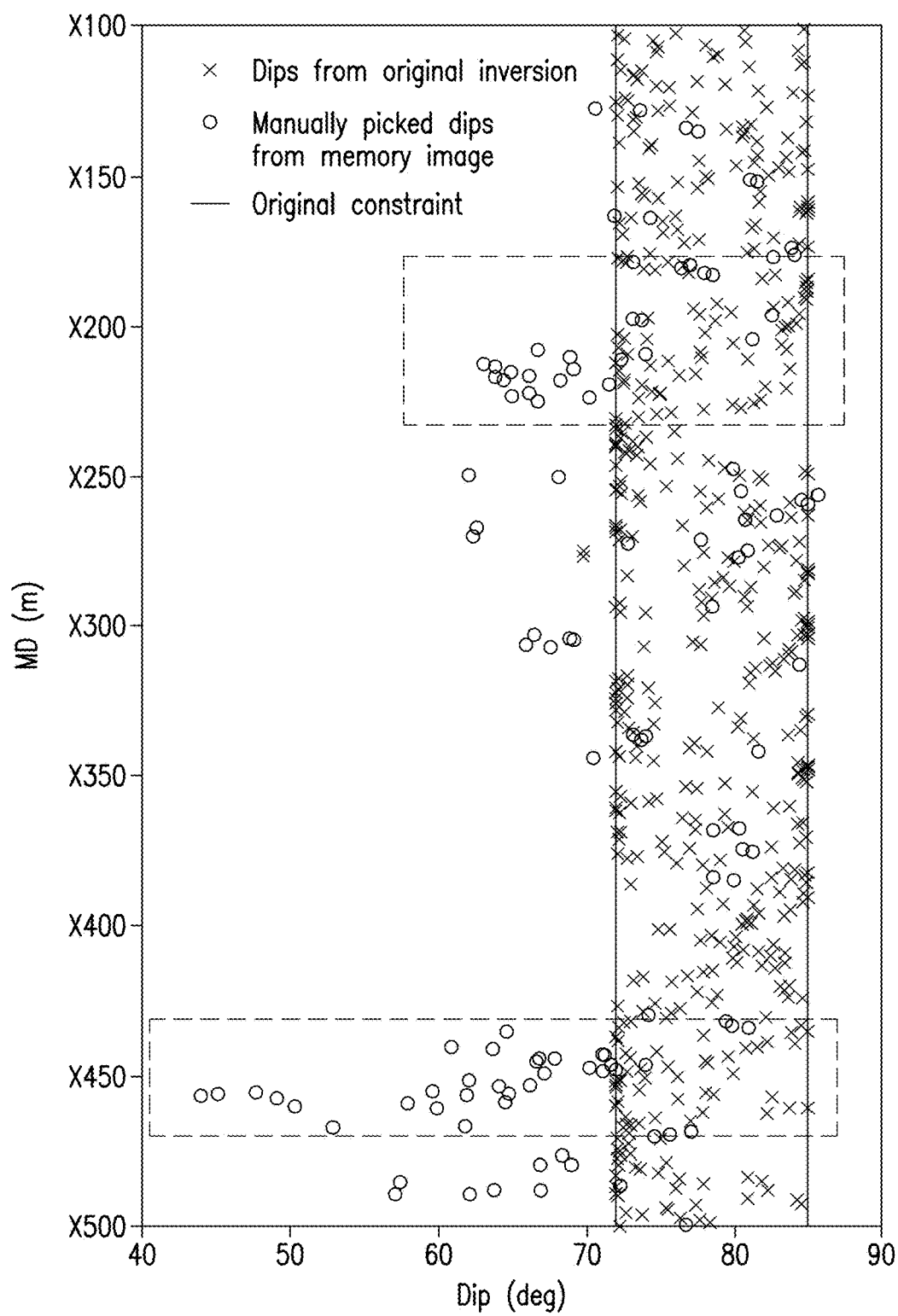
FIG. 9 illustrates a comparison of relative dips derived from image interpretation and unconstrained inversion, respectively (dashed rectangles represent depth intervals for which constrained inversion is applied)

Dip comparison is now discussed. FIG. 9 shows the relative dips originating from an unconstrained inversion using memory data. The constraints to the four-layer geologic model are similar to the ones taken for real-time reservoir navigation. The dips are constrained to 72 to 85°, except for one interval (X275m), where the minimum dip is 68°. As a reference, manually picked dips from a short-spaced memory density image are plotted. Assuming that the latest acquired dip remains valid until another one is picked, the majority of the dips agree well. Two intervals, however, stand out because the manually picked dips range to 60° (X200 to X300) and to 40° (X440 to X500). Inversion-derived dips accumulate at the minimum dip allowed in these intervals. Therefore, inversion is repeated for parts of these intervals while widening the dip range.

The interval from X150 to X205m is first chosen to evaluate how more rigid constraints, taken from image analysis, influence the inversion results.

Figure 10A:
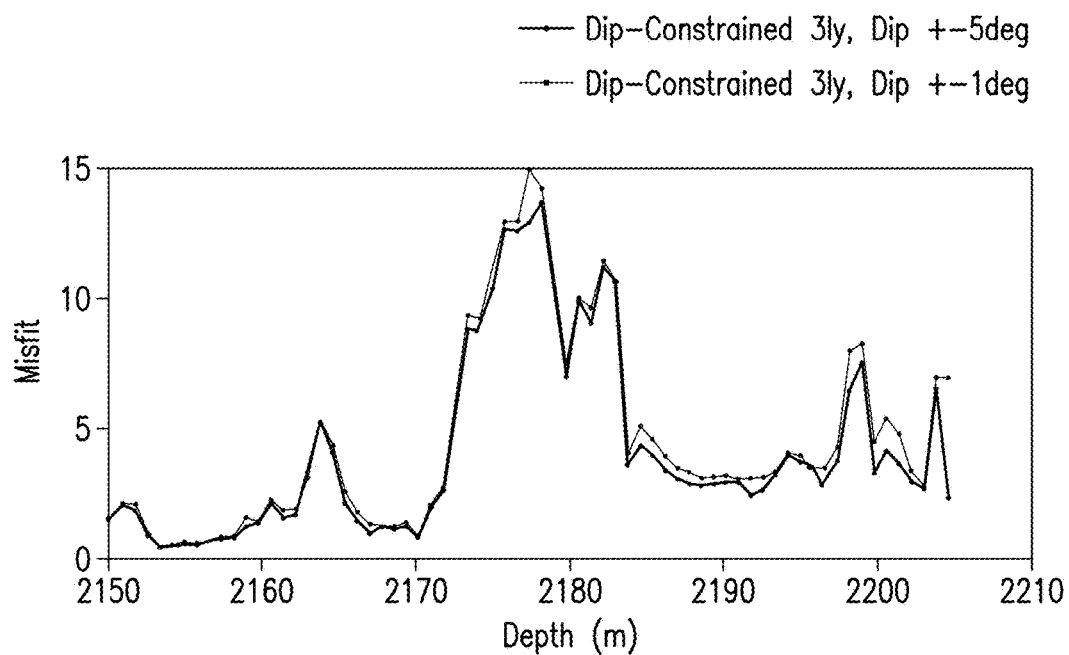
FIGS. 10A and 10B, collectively referred to as FIG. 10, illustrate interval X170 to X205 where misfit is slightly higher when constraining the relative dip with a very narrow range (+−1°) (unless otherwise stated, the following dip-constrained inversions are performed with a dip range of +−5°)
Figure 10B:
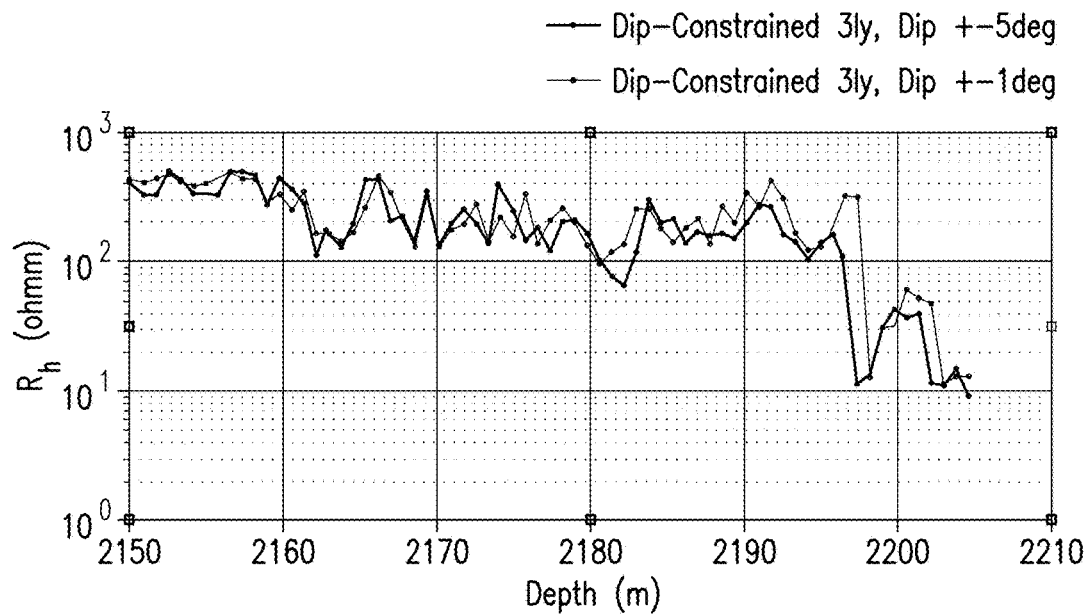

Dip-constraints only are now discussed. The interval from X150 to X205 was inverted with a three-layer starting model. Each interval is 1 m long and intervals overlap by 0.2 m. The resistivity starting model remains constant (Table 1). The first inversion is done with the nearest relative dips taken from the image (cf. FIG. 5 for an explanation), with a range of +−5°, while the second is narrowed to +−1°. FIG. 10 shows that in the latter case, the misfit becomes slightly higher than before. The measured data can be explained better if the relative dip is taken with a wider range. Moreover, the Rh curve from the narrowed scheme becomes spikier, with higher resistivities, especially in the last part of the interval (X190m).

On the one hand, this can indicate that the dip chosen (the nearest as apparent from the density image in this case) does not represent the dip which has the largest effect on the APR sensors (FIG. 5). More information might be needed to identify the most appropriate dip to constrain the inversion. On the other hand, dip-picking is a manual process and picking might not be as exact as +−1°. A slightly wider range can compensate for influences of manual picking.

Table 1 presents a starting model for three- and four-layer inversion. Rh− and Rh+ are lower and upper resistivity inversion limits. The first layer (i.e., first row) is added for the four-layer model.

TABLE 1

| Rh (ohmm) | Rh− (ohmm) | Rh+ (ohmm) | Rv/Rh ratio | H (m) |
|---|---|---|---|---|
| 3 | 2 | 500 | 1-5 | (inf) |
| 10 | 4 | 500 | 1-5 | 0.1-10 |
| 100 | 4 | 500 | 1-5 | 0.1-10 |
| 20 | 4 | 500 | 1-5 | (inf) |

Figure 11:
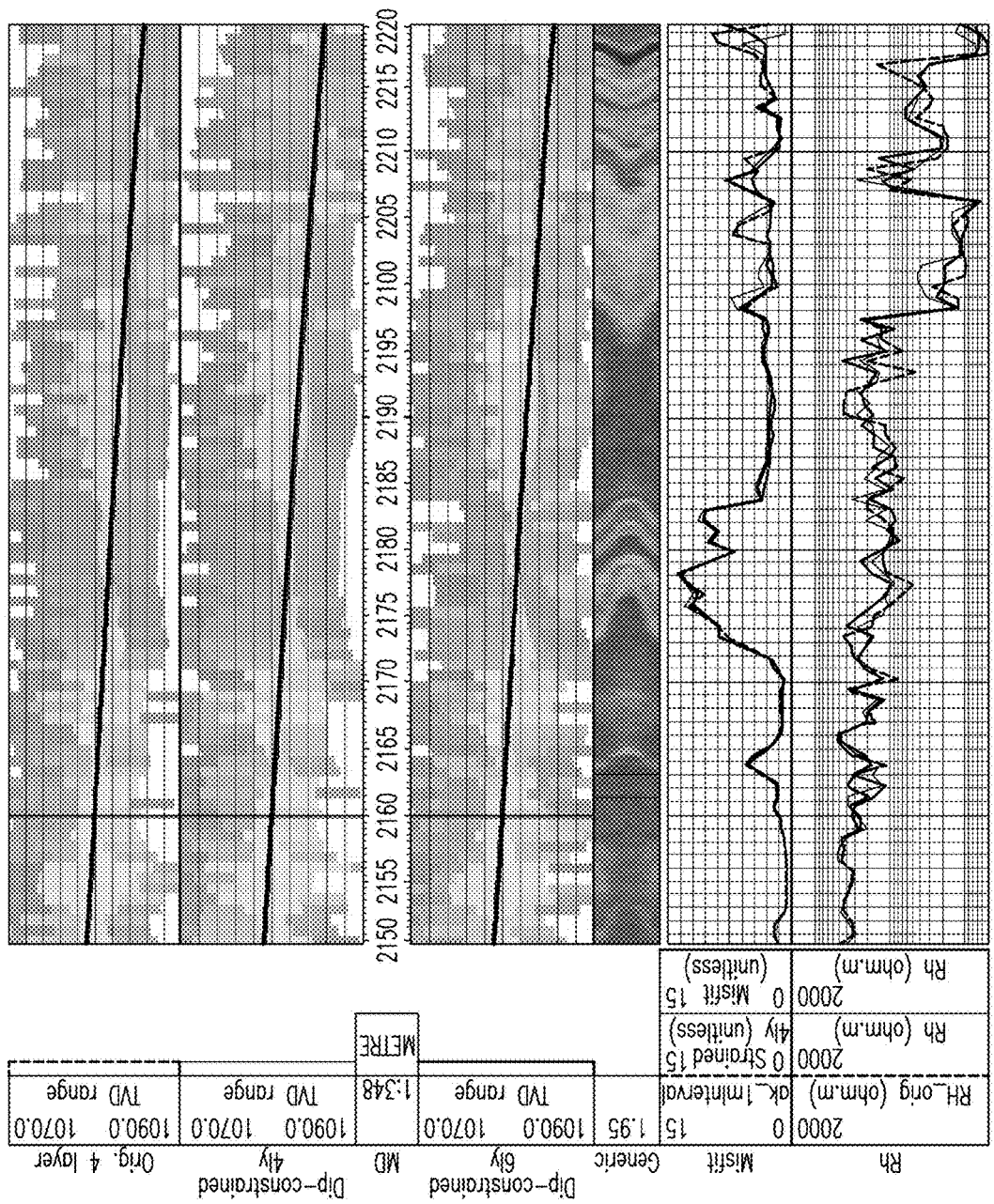
FIG. 11 illustrates resulting curtain sections for unconstrained (four layers, top resistivity map) and dip-constrained setting (four and six layers, center and bottom resistivity maps), (the misfit becomes smaller at the end of this interval)

Dip-constrained versus unconstrained is now discussed. The section is extended to X220 m MD, also covering the part where relative dips from the original result and manual picking diverge (FIG. 9). Results from the following settings are compared: Unconstrained inversion (four layers), dip-constrained inversion (four layers and six layers). FIG. 11 shows curtain sections for the original, four-layer unconstrained inversion and the dip-constrained correspondent. Generally, the resulting curtain sections are similar. However, if the inversion is dip-constrained, the sand body (X180 to X200) becomes thicker at the low side of the borehole, so that the structure of channelized sand is represented as more compact and consistent. The thin layer at X163 m MD is represented in the curtain section, coming in from above. The misfit is marginally lower than for the original result. For the majority of the section, the misfit is the same, although it is slightly higher in the thick sand body (X185 to X193m) and after exiting this layer (X200m). At the end of this interval, a lower misfit is achieved for the dip-constrained result. This coincides with the thin layering identified from the image and the observed difference in relative dips at measured depths of X200 to X225 m. The Rh curve shows the same trends, but eliminates the spikes at X193m and X216m. The biggest differences in Rh are also observed where the misfit changes most. Rh decreases from 150 ohmm to 30 ohmm at X216m and increases from 10 to 30 ohmm at X201m.

If more layers are introduced to the inversion (Table 2), another resistive boundary is revealed below the sand body. With six layers incorporated, the boundary can be followed below the well path. In addition, the sand layer that is crossed at X172m is now more consistently represented. Only 2 MHz and 400 kHz data are used for this near-wellbore study. The misfit achieved with this expected model setting again only changes considerably in the last section of the interval. At approximately X205 m MD, the misfit is reduced from 7 to 3.

Table 2 is a starting model for six-layer inversion. The second and sixth layers (i.e., second and sixth rows) were added to the model in Table 1.

TABLE 2

| Rh (ohmm) | Rh− (ohmm) | Rh+ (ohmm) | Rv/Rh ratio | H (m) |
|---|---|---|---|---|
| 3 | 2 | 500 | 1-5 | (inf) |
| 10 | 4 | 500 | 1-5 | 0.1-5 |
| 10 | 4 | 500 | 1-5 | 0.1-10 |
| 100 | 4 | 500 | 1-5 | 0.1-10 |
| 20 | 4 | 500 | 1-5 | 0.1-12 |
| 20 | 4 | 500 | 1-5 | (inf) |

Figure 12:
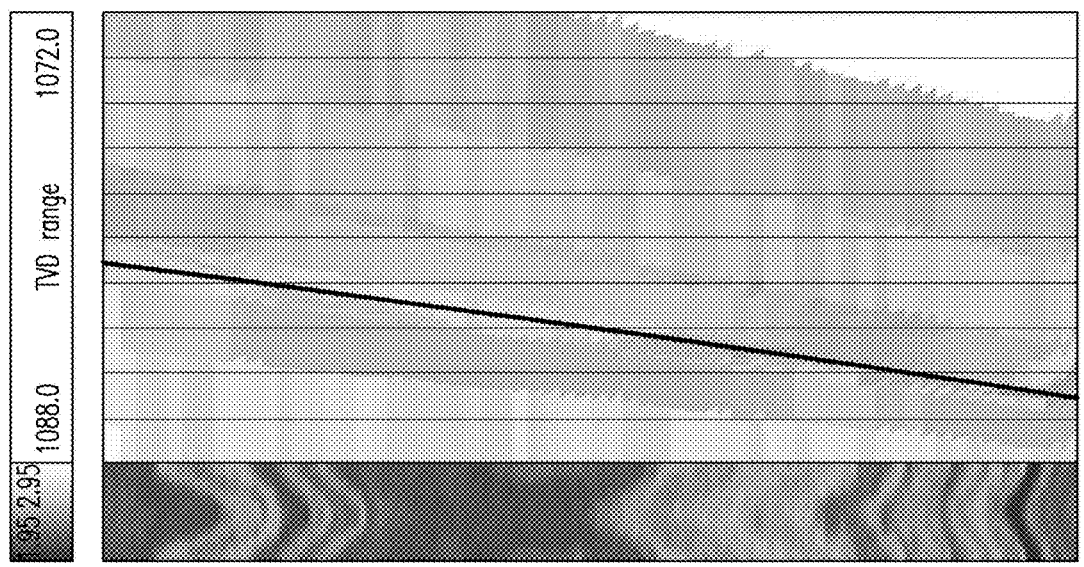
FIG. 12 illustrates a curtain section resulting from image-constrained inversion.
Figure 13:
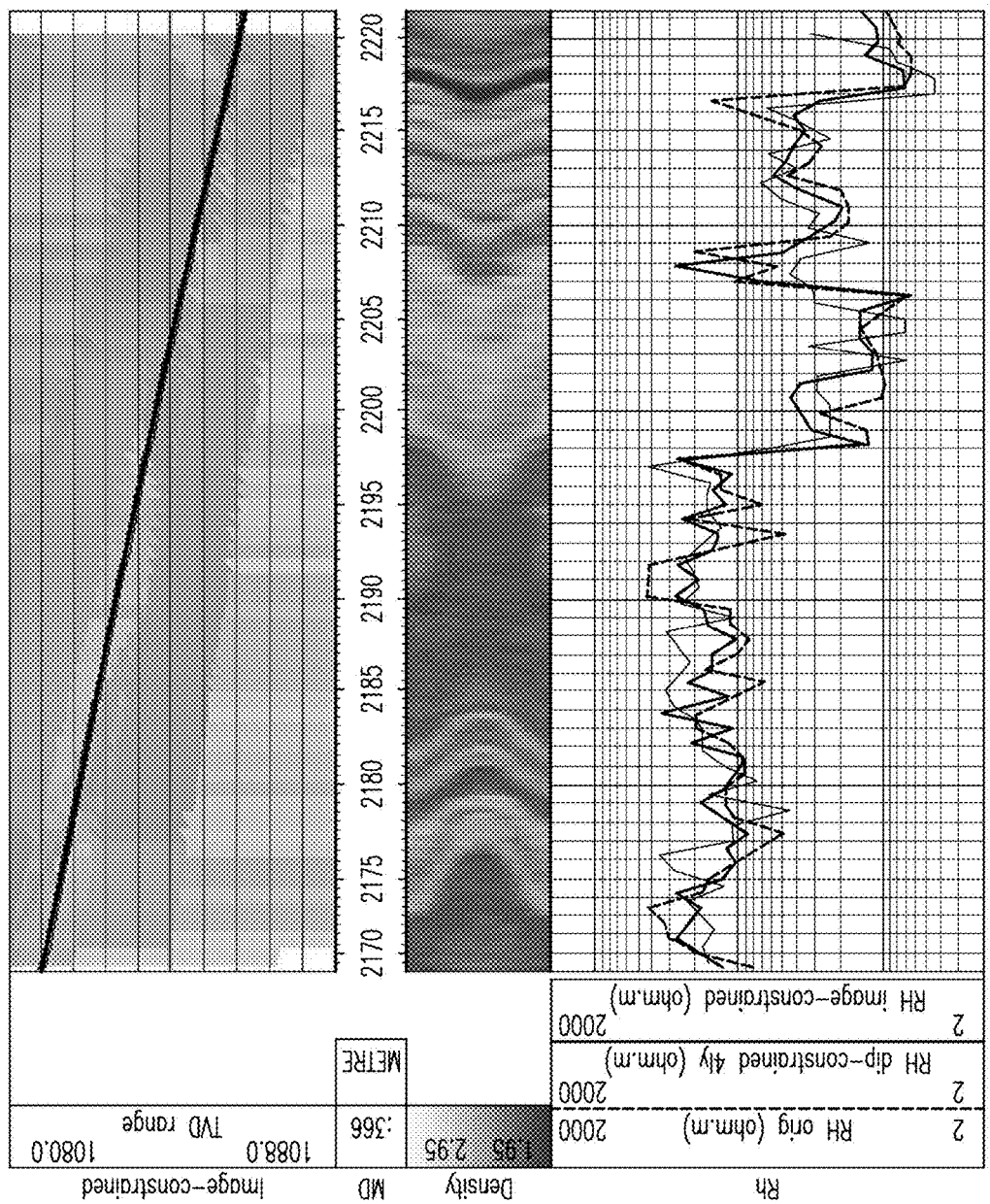
FIG. 13 illustrates results section and Rh for the image-constrained result, dip-constrained four-layer result, and original four-layer inversion result—black dashed)
Figure 14:
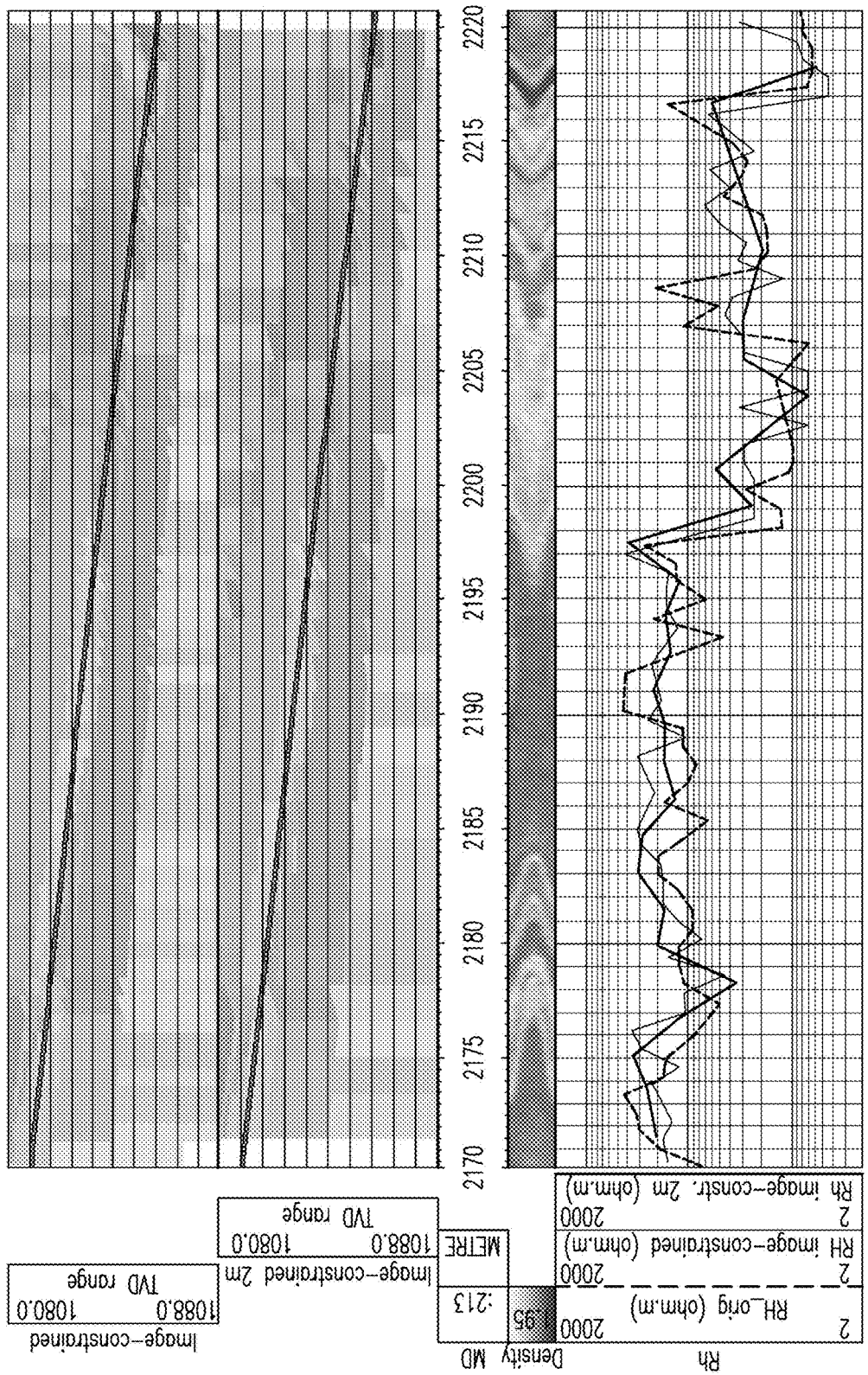
FIG. 14 illustrates that the results sections for inversion with 1 m (above) and 2-m intervals (below) are similar (both results show the need for two-dimensional inversions in certain parts of the interval)

Image-constrained inversion interval 1 is now discussed. The complex image-derived geological model is used as a starting model for the inversion. Layer positions and thicknesses therefore vary for each 1D interval according to the underlying structural model. Table 3 shows a summary of the parameters used. FIG. 12 shows the resulting inversion within the curtain section. In this case, the dip range is not constrained, i.e. the range is left as a variable for the inversion from 0 to 90°. However, the image-interpreted relative dip from the strongest Rh contrast in the direction of the azimuthal target angle is the starting value (see FIG. 5 for explanation). Therefore, applying the 1D inversion delivers one representative dip, which is mapped on all layer boundaries within the 1D stripes.

Table 3 presents inversion options for interval 1.

TABLE 3

| Rh (ohmm) | Rh− Rh+ (ohmm) | Rv/Rh ratio | H (m) | Dip-constraint |
|---|---|---|---|---|
| From unconstrained inversion result | 0.5 * Rh − 2 * Rh | 1-5 | Fixed from image interpretation | Strongest contrast from image interpretation (range 0-90 deg) |

Because of the starting model and constraints, the model is much more complex than before. Some of the layers cross the borehole outside of the plotted interval. Layers can be followed through the whole curtain section. However, as a consequence of 1D inversion, the individual dip might be plotted differently if another dip is more relevant in this interval. Comparing the result to the input geological model, this is caused by contradicting dips in each 1D interval. A very good agreement is achieved at the beginning of the section, up to X176m and from X178 to X186m (FIG. 12). Also, the section from X198 to X210 and the end of the section are well represented. Although the starting value for the dip is set according to the image interpretation and the APR target angle, interpretation becomes more complicated if varying dips are present within 1D intervals. The layers visible at the end of this interval (X215m to X220m) can be only presumed from the original result, but are now confirmed from the image-constrained result. Additionally, the shape and position of the sand body (X180 to X190m) are verified by the constrained result. However, the extent of the sand body is larger if the inversion is narrowed with the dip only. This difference can be explained with the setup of the complex geological model: the knowledge about a layer is available from formation evaluation measurements when crossing the borehole. The linear progress further away is a first estimate for characterization, taking into account erosional behavior. Inversion can, like in this example, deliver valuable further information about the formation. Having curtain sections from several workflows to compare enables structures to be more easily identified. Another example is the section from X170 to X180m where the position of the layer below the borehole trajectory varies in the dip-constrained-only result. The complex, image-constrained workflow defines the layer position differently, enabling variances for the resistivity of this layer only. This could also explain a higher misfit of the inversion result. The uncertainty of layer positions derived from near-wellbore image interpretation becomes higher with increasing distance from the wellbore. The emerging ambiguity illustrates the need for the right constraints to the inversion. Combining and comparing various approaches, automated, partly constrained and strongly-constrained from the borehole image, is therefore a recommended way of identifying similarities and differences in the results.

The Rh values for this setup are generally in line with the other Rh curves, but avoid the larger spikes in resistivity, especially in the second half of the interval. Major polarization effects at the boundary crossing (X197m), however, are still present.

The same interval was inverted with intervals lengths of 2 m. The result reveals the same properties as the inversion with the 1 m setting. While the layers are consistently reflected in the first part of the section (X170 to X175), for example, there are areas of contradicting relative dips (X190 to X195, X210), making the representation difficult. The Rh curve looks smoother, showing more general trends. A 1D representation is not enough in this complex scenario. However, it is not known exactly from which layer the relative dip is taken in the inversion. The azimuthal target angles only give the direction above or below in 1D scenarios. If all relative dips are taken into account and displayed, a 2D inversion and representation is needed.

Figure 15:
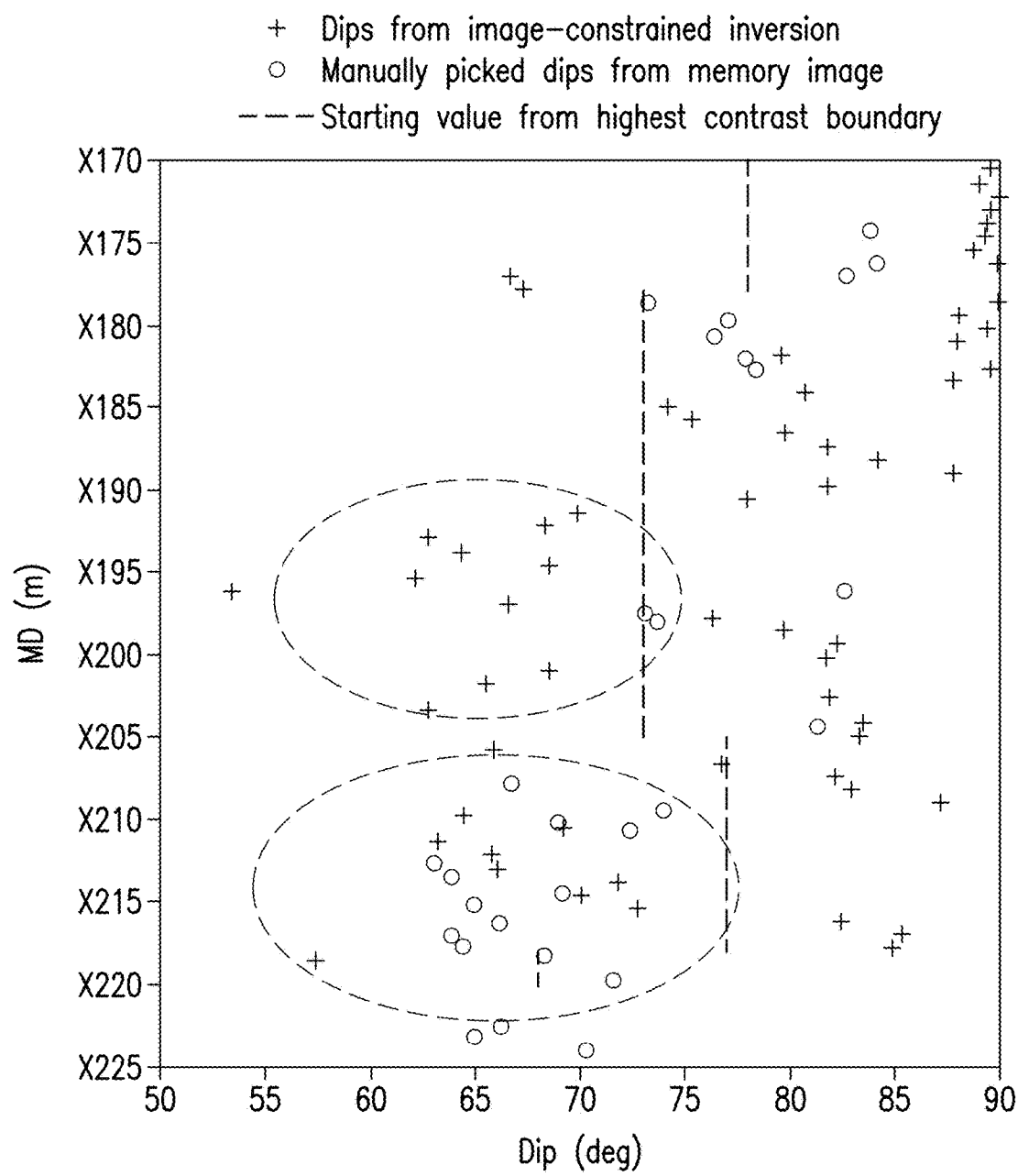
FIG. 15 illustrates that inversion results in Interval 1 show the low relative dips picked at X210 to X220 result from inversion before crossing the layers (X190 to X205)

The relative dips following from the inversion are plotted in FIG. 15 together with the manually picked dips and the dip starting value used to run the inversion. The manually picked dips partially differ from the inversion result. The manually picked dips at X210 to X220 m MD are very well reflected by the inversion results, although the starting value is defined as much higher (dashed line, chosen from highest resistivity contrast in the starting model).

Similar values of relative dips were calculated also at X195 to X205, i.e. before crossing the corresponding layers (at X210 to X220 m MD). This observation might indicate the higher depth of investigation of the APR/MPR measurements and demonstrates that one single method for choosing the most relevant dip is not be sufficient because it might change from the nearest layer to the layer with the strongest resistivity contrast. Moreover, the strongest resistivity contrast is also only an initial assumption that subject to change in the model after running the inversion.

Image-constrained inversion interval 2 is now discussed. A second interval at the end of this wellbore was used for testing the proposed workflow. This is the second section where the original dip comparison (FIG. 9) revealed large differences. In contrast to interval 1, a smaller number of layers follows from the image interpretation and the initial earth model is less complex. Furthermore, the constraints to this section were changed (Table 4).

Table 4 presents inversion settings for interval 2.

TABLE 4

| Rh (ohmm) | Rh−Rh+ (ohmm) | Rv/Rh ratio | H (m) | Dip-constraint |
|---|---|---|---|---|
| From unconstrained inversion result | 1-500 | 1-5 | Fixed from image interpretation | Strongest contrast from image interpretation (range 0-90 deg) |

Figure 16:
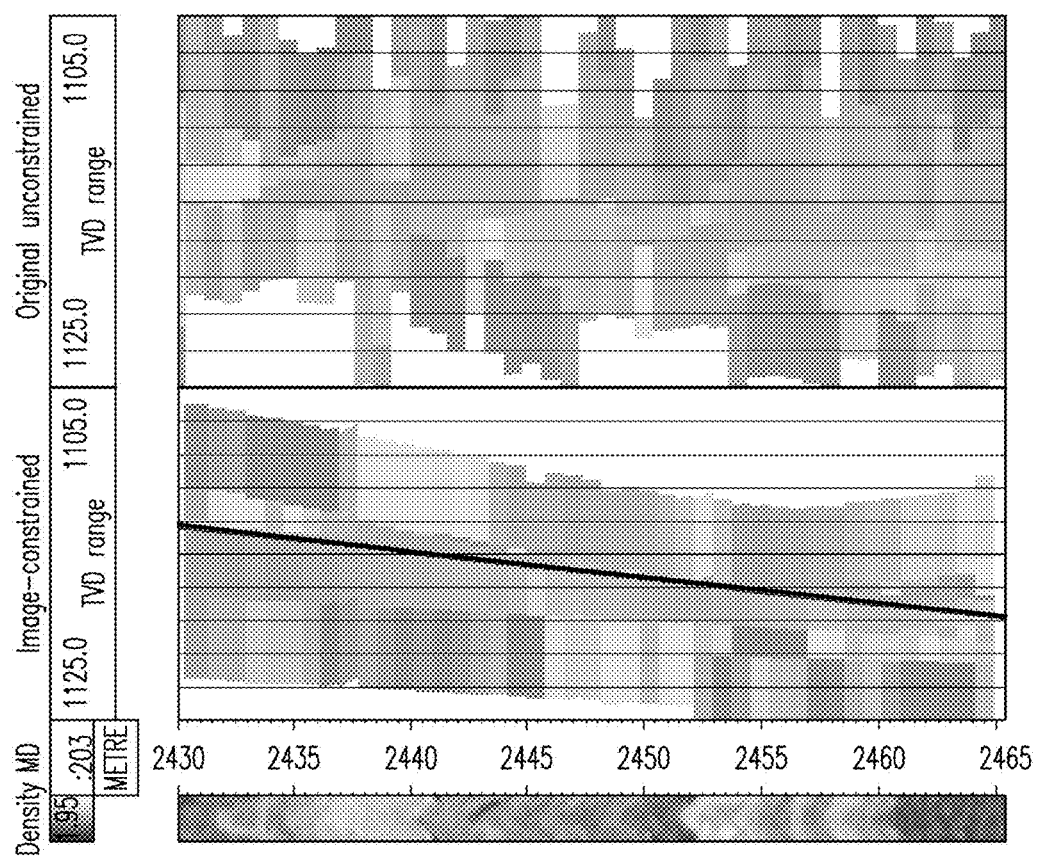
FIG. 16 illustrates inverted result from image-constrained inversion (below) and original four-layer unconstrained result (above)
Figure 17:
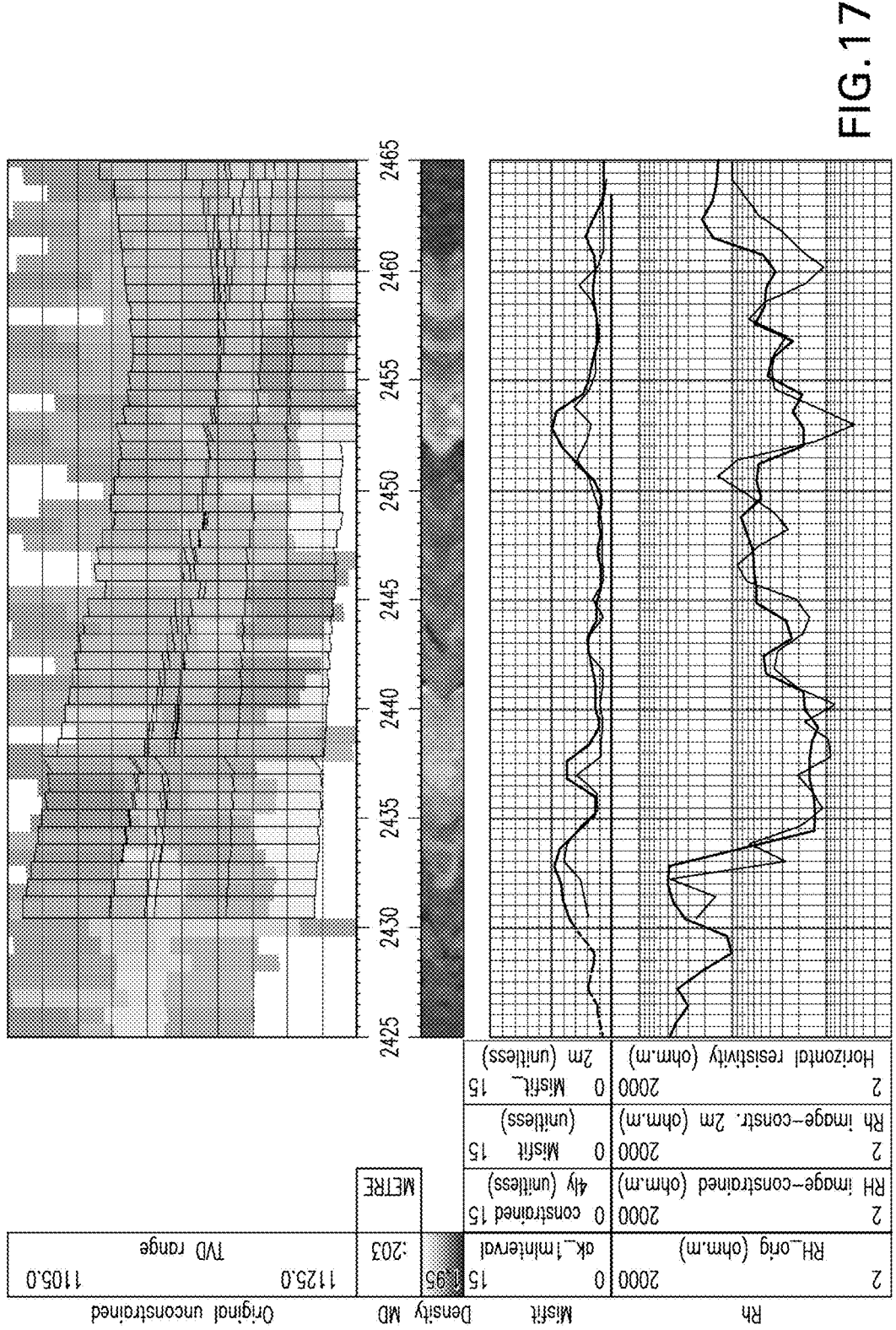
FIG. 17 illustrates an overlay of the image-constrained layer-boundaries with the original result (some of the structures are well recognized, the image-constrained result reduces the misfit for parts of the interval)

FIG. 16 and FIG. 17 show that the image-constrained inversion confirms the previously achieved result, but adds more detail to it. Relative dips are represented more consistently than for the first interval presented earlier. Moreover, image-constrained inversion reduced the misfit for some sections, especially at X435 to X440m and X450 to X455m, but also at the end of this interval where the geological model again includes a larger number of layers (FIG. 17). The Rh curve follows the previously deduced curve, yet includes more spikes if small layers are crossed. The amount of detail, which is included in the geological model, is critical to the inversion result and derived formation properties.

Saturation Estimates

The resistivity output from both image-constrained and unconstrained inversion processes was used to estimate water saturation (SW) using the same equation and the same parameters of the petrophysical model applied to the field. The obtained water saturation profile was the compared with the existing water saturation estimate, based on field-released resistivity (SW_ORIG). Finally, the differences in terms of evaluated SW were analyzed to evaluate the quality of the resistivity inversion.

Figure 18:
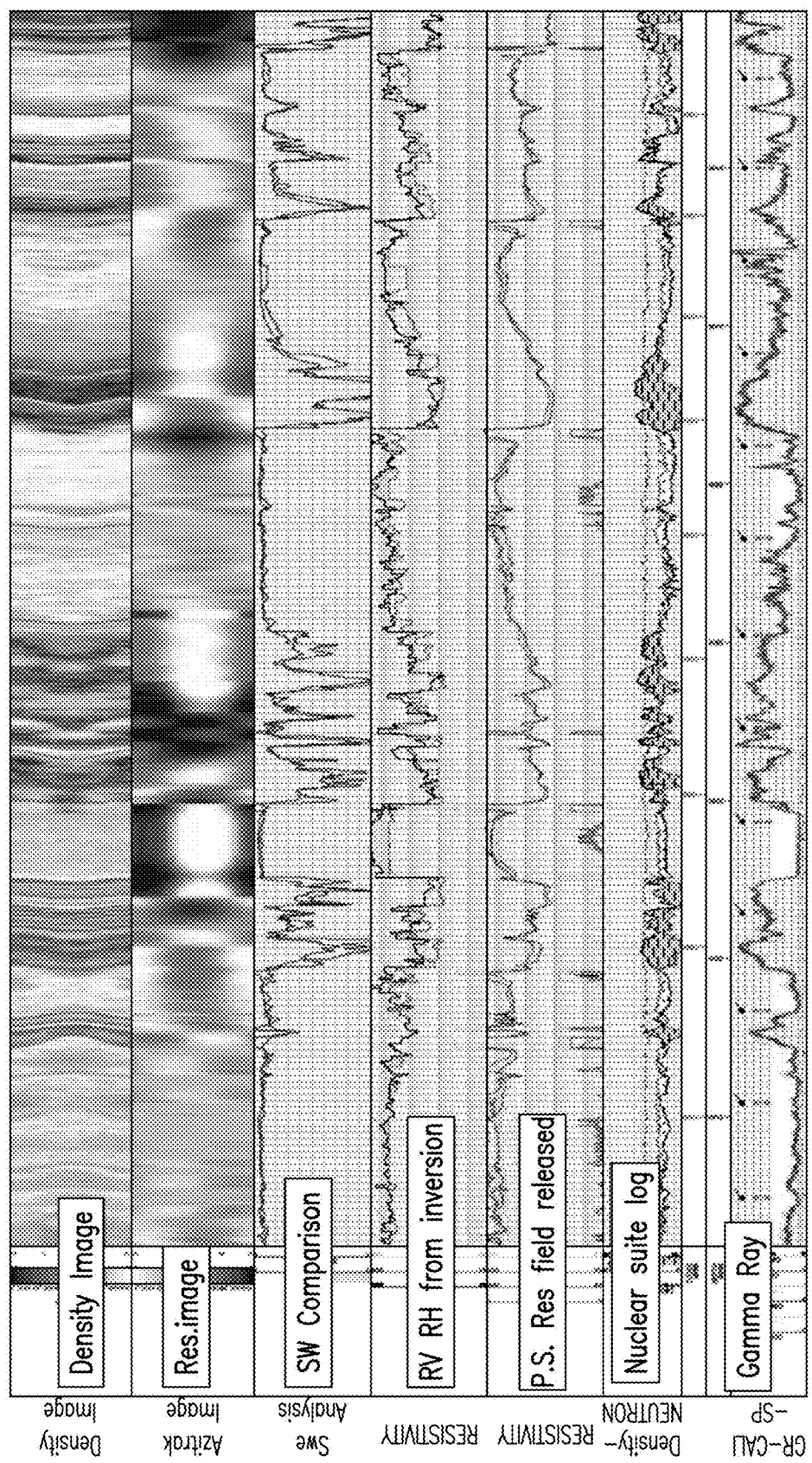
FIG. 18 illustrates saturation estimates from unconstrained inversion.

As a starting point, RH from unconstrained inversion was used. The estimated water saturation (SW_UC) was compared with the original water saturation (SW_ORIG). FIG. 18 shows the comparison and additional formation evaluation curves are reported.

When the well is inside a thick, massive and homogenous sand, SW_UC is very similar to SW_ORIG, based on field-released resistivity. In this situation, acquired resistivity data are representative of the physical reservoir properties because they are affected by very small or no artifacts.

On the contrary, in the intervals where the well crosses some bed boundaries at a high angle, SW_UC is significantly different from the original (SW_ORIG), because the long shoulder effects (artifacts), evident in field-released data, are weakened or canceled in most of the interval. The same benefit may be observed in the presence of polarization horns: the well-known sharp artifacts on resistivity data, related to the interaction between geometry of the bed boundary (apparent dip), frequency and geometry of the EM tools, and resistivity contrast of crossed beds, are completely removed in the resistivity derived from the inversion process.

Furthermore, some proximity effects related to stacked beds settings have been "corrected" and the SW_UC calculated in this interval is more realistic and coherent with the field evidence from offset vertical appraisal wells.

Figure 19:
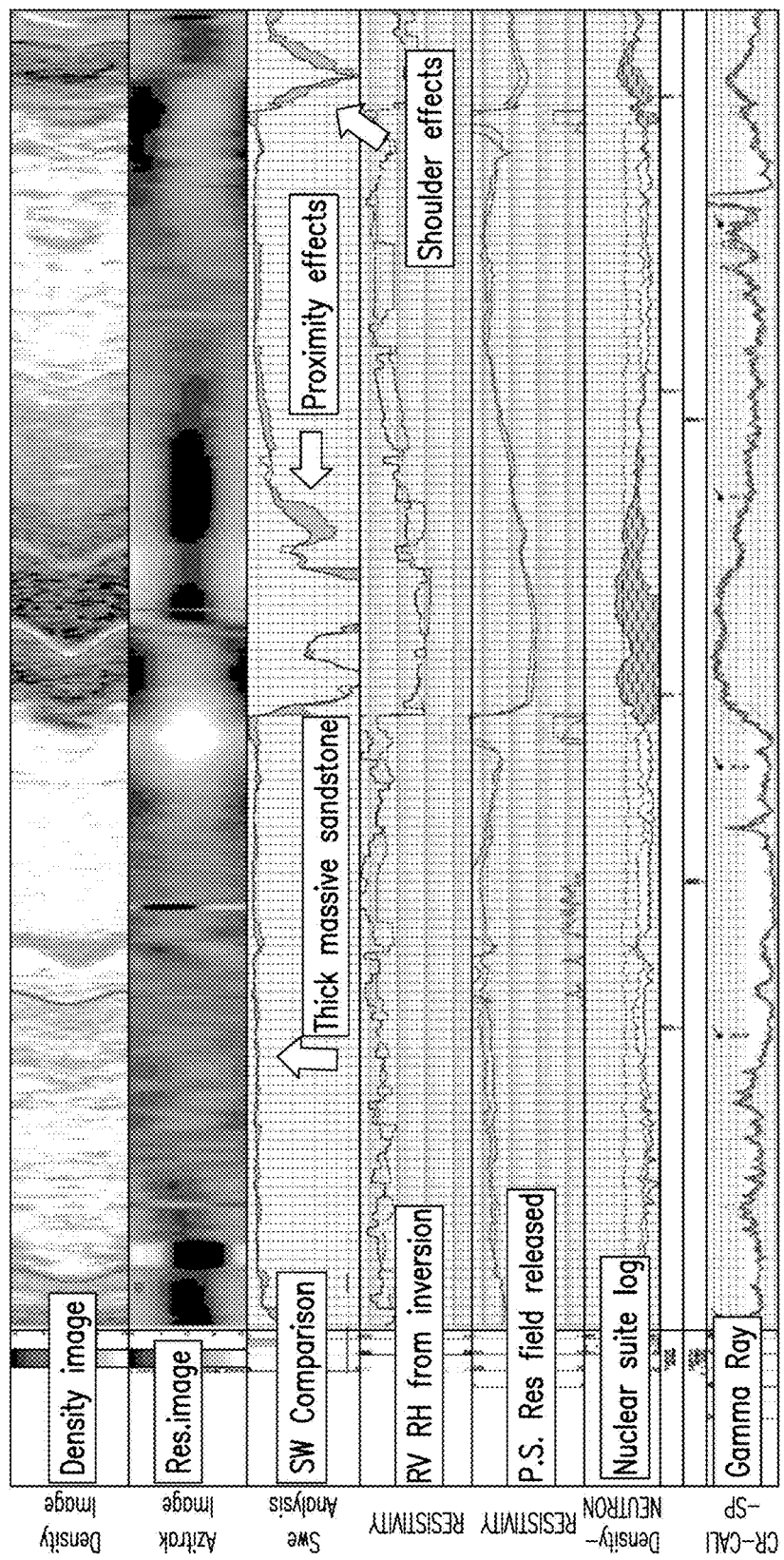
FIG. 19 illustrates a comparison of Sw results from unconstrained inversion.

The overall result is a water saturation evaluation (SW_UC) more representative of the physical layer properties as illustrated in FIG. 19.

Figure 20:
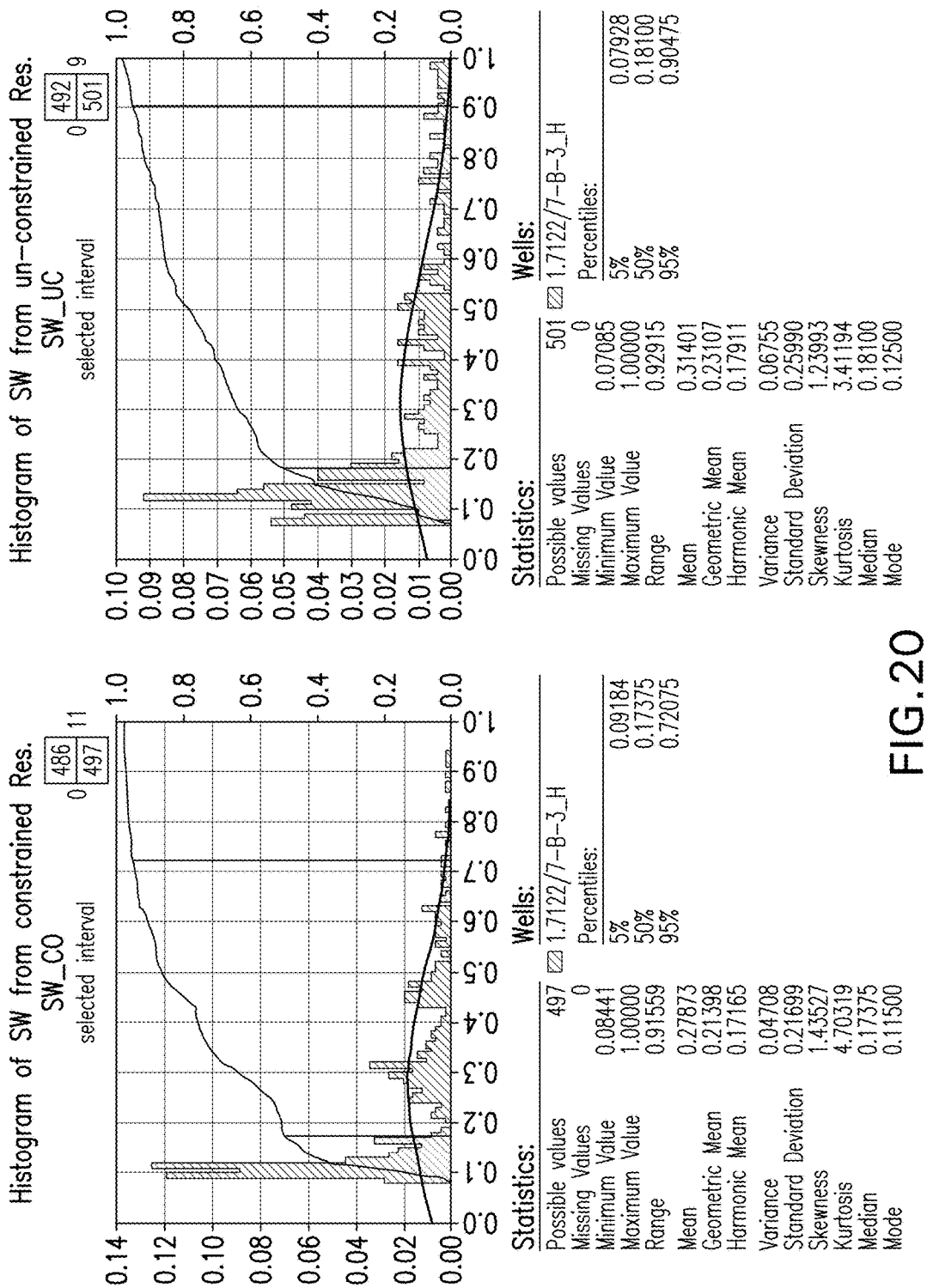
FIG. 20 illustrates water saturation estimated from resistivity obtained by constrained (left) and unconstrained inversion (right) vary slightly in the higher values.

Afterwards, the image-inverted constrained resistivity was used to estimate a new water saturation profile (SW_CO), and this new output was compared to SW_UC. The results are further improved when compared to SW_ORIG, even if the most important achievement was already obtained by the first step of the described methodology. Overall, in this example, the results obtained by using resistivity from constrained inversion can be considered, in these tests, as a refining of the non-constrained inversion results. In FIG. 20, the comparison of the statistical parameters of the distribution of the two estimated SW are in line, possibly with slight differences in the higher values.

CONCLUSIONS

The following conclusions can be drawn from the inversion evaluation.

LWD resistivity inversion can deliver, at a larger scale and while combining various frequencies and transmitter-receiver-spacings, accurate formation resistivity mapping for reservoir navigation purposes. Integration of LWD image interpretation and ultra-deep electromagnetic data inversion can be used to deliver robust formation resistivity values in horizontal wells for a water saturation estimate. A workflow aimed to this target at wellbore scale has been tested and discussed.

Finer-scale geological structures which affect the shallow-reading resistivity logs reveal inaccurate formation resistivities at the wellbore scale. Applying algorithms to invert measured resistivities on smaller scales may benefit from constraints for other data sources to refine the structural earth model and, by that, reduce the ambiguity of solutions.

Constraints must be applied carefully and case-dependent unless the certainty of structural information away from the wellbore is very high. Rather, a recommendation from the authors is to leave some inversion parameters unconstrained but assign a reliable starting value (such as a dip from inversion).

Structural information from images is derived from logs acquired at, or very close to, the wellbore wall. By scanning the borehole wall with a shallow depth of investigation for a particular measurement parameter such as resistivity, density, or porosity, etc. an image from the borehole wall is created from which planar structures can be identified as they appear as a sinusoidal discontinuity in the image. However, as this type of images is acquired at a shallow depth of investigation from the borehole wall, the extent of those structures deeper into the formation is an additional source of structural uncertainty. That uncertainty may be reduced by taking additional information, for example, from deep-shear-wave-imaging. Deep shear wave imaging and also deep compressional wave imaging are acoustic methods which can be applied on data from an acoustic imaging tool. Although this type of tools are also called imaging tools, they work according to another measurement principle. For example, deep shear wave imaging tools and deep compressional wave imaging tools do have a much higher depth of investigation and can be used to identify structures at much larger distance away from the borehole wall. Consequently, the image that is created by these tools is usually not an image from the borehole wall but is an image of structures in a plane that includes a part of the borehole wall and is oriented parallel to the borehole axis. It is to be understood that even though both types of imaging tools are working with different principles and do deliver images of different portions of the subsurface, they are both included when referring to imaging tools. These methods use reflected compressional or shear wave excited by an acoustic source, which is for example placed in an acoustic logging tool. Common or advanced migration algorithms such as but not limited to Kirchhoff migration may be used to convert arrival times of the reflected waves to derive an image of an Earth formation which highlights bed boundaries or other structures with sufficiently strong acoustic impedance contrast. For example, bed boundaries or oil-gas contacts may exhibit high acoustic impedance contrasts.

Refined structural models do not necessarily reduce the inversion misfit between the synthetic data and the measurements, which is not a weakness of the inversion but rather reflects the ambiguity of models and the need to constrain models for geologically sound resistivity profiles.

The starting model for the inversion is essential and additional knowledge shall be incorporated when constructing it. Nonetheless, ranges for parameters (relative dips, resistivities) must not be constrained too much, leaving the data-driven inversion to decide which model fits best and also to compensate for uncertainties in dip-picking and defining the resistivities. In the new approach, the layer positions are fixed based on the image interpretation. Especially when going further away from the wellbore, the structures might change. The relative dip read from the density image might also not be the most representative one. A further step in the suggested workflow would therefore be choosing the source of the relative dip (closest or strongest contrast or manually defined). In summary, various levels of constraints must be compared for consistency.

In horizontal wells, resistivity obtained from inversion is more representative of the physical properties of the reservoir in situations where the impact of the geology and geometry is detrimental for the acquired data representativeness. The water saturation calculated using the inversion-derived resistivity is more in line with the expected values.

In extremely heterogeneous reservoir sections with rather large variations of relative dips within inversion intervals, two-dimensional (2D) forward and inversion modeling is essential to resolve the MPR/APR tool responses by inversion algorithms. These sections can be identified from 1D constrained results, facilitating the decisions on where to run computationally intense 2D inversions.

The novelty of the disclosure relates to the way the inversion scheme is constrained and how a start value for the inversion scheme is defined. Applying a particular rule to constrain the inversion and to define start values for the inversion increases the likelihood for the inversion algorithm to find the best possible Earth model which explains the measured log responses obtained from formation evaluation tools.

More particularly, the following steps may be part of constraining the inversion and defining start values. These steps use an image to interpret relative dips between a well trajectory and a bed boundary.

For the inversion, constraining the relative dip (see FIG. 5 for clarification) may include:
  Constraining the relative dip by identifying the bed boundary with the largest resistivity contrast;
  Constraining the relative dip by identifying the bed boundary which is closest to the wellbore;
  Constraining the relative dip by identifying a combination of the above; and/or
  Constraining the relative dip by defining a range of relative dips, the range being defined from the minimum to the maximum relative dips as observed at a position along the well trajectory.

For the inversion, defining a start value for the relative dip may include:
  Defining a start value by identifying the bed boundary with the largest resistivity contrast;
  Defining a start value by identifying the bed boundary which is closest to the wellbore;
  Defining a start value by identifying a combination of the above; and/or
  Defining a start value by defining a range of relative dips, the range being defined from the minimum to the maximum relative dips as observed at a position along the well trajectory.

For the inversion, using an image to interpret relative dips between a well trajectory and a bed boundary may include:
  Defining layer positions at the wellbore which result from the relative dips and use the layer positions as a constraint on the inversion;
  Defining layer positions away from the wellbore by linear extrapolation of bed boundaries for the relative dips at the wellbore and use the layer positions as a constraint on the inversion;
  Defining layer positions away from the wellbore by another extrapolation of bed boundaries for the relative dips at the wellbore and use the layer positions as a constraint on the inversion;
  Defining layer positions away from the wellbore by constraining the layer positions using deep-reading measurements such as deep shear-wave imaging and use the layer positions as a constraint on the inversion;
  Defining a range of layer positions use the range of layer positions as a constraint on the inversion; and/or
  Defining the range as a function of distance away from the wellbore, with the range increasing with increasing distance away from the wellbore, and use the range of layer positions as a constraint on the inversion.

For the inversion, the following actions may also be included:
  Defining layer positions at the wellbore which result from the relative dips and use the layer positions as a starting model for the inversion;
  Defining layer positions away from the wellbore by linear extrapolation of bed boundaries for the relative dips at the wellbore and use the layer positions as a starting model for the inversion;
  Defining layer positions away from the wellbore by another extrapolation of bed boundaries for the relative dips at the wellbore and use the layer positions as a starting model for the inversion; and/or
  Defining layer positions away from the wellbore by constraining the layer positions using deep-reading measurements such as deep shear-wave imaging and use the layer positions as a starting model for the inversion.

Figure 21:
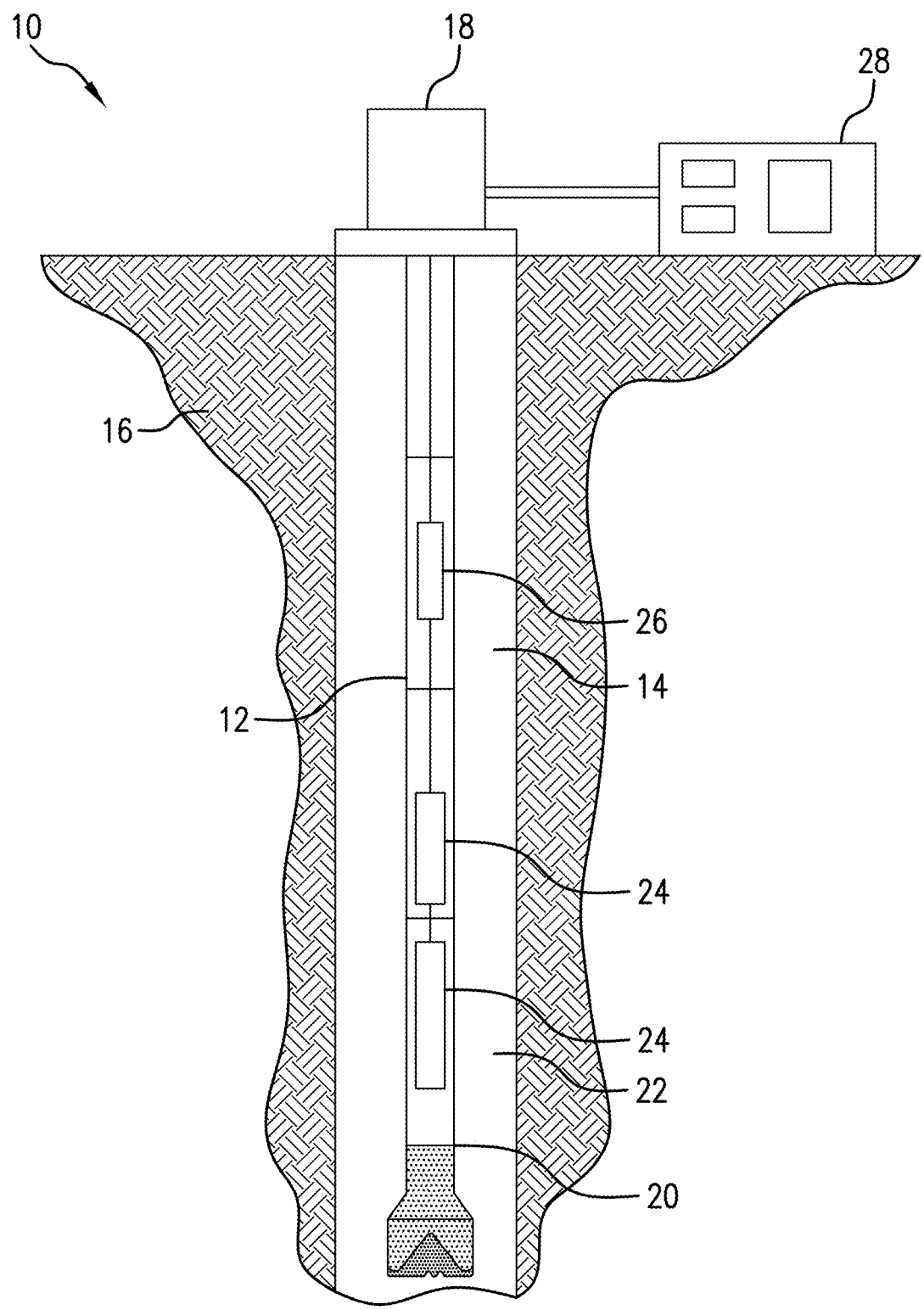
FIG. 21 depicts an embodiment of a drilling, formation evaluation and/or production system.

An example of apparatus for implementing the disclosure herein is now discussed. Referring to FIG. 21, an exemplary embodiment of a well drilling, logging and/or production system 10 includes a borehole string 12 that is shown disposed in a wellbore or borehole 14 that penetrates at least one earth formation 16 during a drilling or other downhole operation. As described herein, "borehole" or "wellbore" refers to a single hole that makes up all or part of a drilled well. As described herein, "formations" refer to the various features and materials that may be encountered in a subsurface environment and surround the borehole.

A surface structure 18 includes various components such as a wellhead, derrick and/or rotary table or supporting the borehole string, lowering string sections or other downhole components which may include completion components. The surface structure 18 may also be configured to perform completion actions such as installing production piping or tubing, setting packers, and/or performing perforations as non-limiting examples. In one or more embodiments, the borehole string 12 is a drillstring including one or more drill pipe sections that extend downward into the borehole 14, and is connected to a drilling assembly 20. In one or more embodiments, system 10 includes any number of downhole tools 24 for various processes including formation drilling, geosteering, and formation evaluation (FE) for measuring versus depth and/or time one or more physical quantities in or around a borehole. The tool 24 may be included in or embodied as a bottomhole assembly (BHA) 22, drillstring component or other suitable carrier. A "carrier" as described herein means any device, device component, combination of devices, media and/or member that may be used to convey, house, support or otherwise facilitate the use of another device, device component, combination of devices, media and/or member. Exemplary non-limiting carriers include drill strings of the coiled tubing type, of the jointed pipe type and any combination or portion thereof. Other carrier examples include casing pipes, wirelines, wireline sondes, slickline sondes, drop shots, downhole subs, bottom-hole assemblies, and drill strings.

The tool 24, the BHA 22 or other portions of the borehole string 12 includes sensor devices configured to measure various parameters of the formation and/or borehole. In one or more embodiments, the sensor devices include one or more transmitters and receivers configured to transmit and receive electromagnetic signals for measurement of formation properties such as composition, resistivity and permeability. An exemplary measurement technique is a transient EM technique.

In one or more embodiments, the tool 24, BHA 22 and/or sensor devices include and/or are configured to communicate with a processor to receive, measure and/or estimate directional and other characteristics of the downhole components, borehole and/or the formation. For example, the tool 24 is equipped with transmission equipment to communicate with a processor such as a downhole processor 26 or a surface processing unit 28. Such transmission equipment may take any desired form, and different transmission media and connections may be used. Examples of connections include wired, fiber optic, acoustic, wireless connections and mud pulse telemetry.

The processor may be configured to receive data from the tool 24 and/or process the data to generate formation parameter information. In one embodiment, the surface processing unit 28 is configured as a surface drilling control unit which controls various drilling parameters such as rotary speed, weight-on-bit, drilling fluid flow parameters and others.

In one or more embodiments, the tool 24 is configured as a downhole logging tool. As described herein, "logging" refers to the taking of formation property measurements. Examples of logging processes include measurement-while-drilling (MWD) and logging-while-drilling (LWD) processes, during which measurements of properties of the formations and/or the borehole are taken downhole during or shortly after drilling. The data retrieved during these processes may be transmitted to the surface, and may also be stored with the downhole tool for later retrieval. Other examples include logging measurements after drilling, wireline logging, and drop shot logging.

Figure 22:
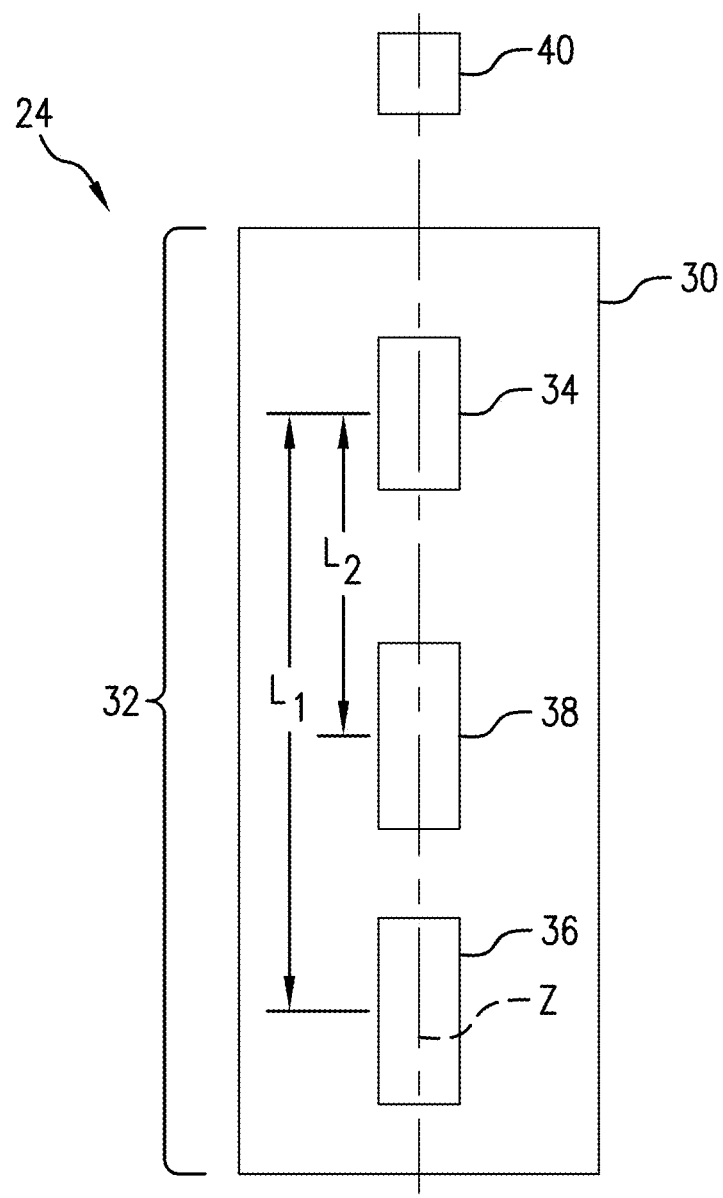
FIG. 22 depicts an embodiment of a downhole tool.

FIG. 22 illustrates an embodiment of the downhole tool 24. The downhole tool 24 is disposed in a carrier such as a housing 30. The housing is incorporated as or in a downhole component such as a borehole string section, a drill pipe or a drill collar. The housing 30 and/or other component are typically made from a conducting material such as steel. The tool 24 includes a resistivity measurement assembly 32 incorporating at least one electromagnetic (EM) source and multiple EM receivers. An EM transmitter 34 (e.g., a transmitter antenna or coil) is configured to emit an electric or magnetic field into the formation 16 and induce a magnetic field response that is measured by one or more EM receivers 36 and 38 (e.g., receiver coils). An electric source 40, which may be disposed downhole or at a surface location, is configured to apply electric current to the transmitter 34.

In one or more embodiments, the measurement assembly 32 is configured to perform an inductive transient EM measurement operation. The source 40 applies transient pulses of current to the transmitter 34, which induces current in the formation 16. The current generates a magnetic field that is detected by the receivers 36 and 38.

The tool 24 utilizes electromagnetic measurements to determine the electrical conductivity of formations surrounding the borehole. Various types of tools may be employed to measure formations at various "depths of investigations" or DOI, which correspond to distances from the tool and/or borehole in a direction perpendicular to an axis of the tool and/or borehole (e.g., the Z axis of FIG. 2), referred to herein as "radial distances." Transient EM methods are particularly useful for ultra-deep investigations (e.g., radial distances of tens to hundreds of meters from the tool and/or borehole). Typically, voltage or current pulses that are excited in a transmitter initiate the propagation of an electromagnetic signal in the earth formation. Electric currents diffuse outwards from the transmitter into the surrounding formation. At different times, information arrives at the measurement sensor from different investigation depths. Particularly, at a sufficiently late time, the transient electromagnetic field is sensitive only to remote formation zones and does not depend on the resistivity distribution in the vicinity of the transmitter.

In one or more embodiments, the transmitter and the receivers are disposed axially relative to one another. An "axial" location refers to a location along the Z axis that extends along a length of the tool 24 and/or borehole 14. The first receiver 36 is positioned at a selected axial distance L1 from the transmitter 34, and the second receiver 38 is positioned at a shorter axial distance L2 from the transmitter. For example, the first and second distances are selected to have a specific ratio, e.g., L1 is twice that of L2.

In one or more embodiments, the receivers 36 and 38 are identical or at least substantially identical, such that they would measure the same signal if the receivers are disposed at the same axial and radial location. For example, the receivers 36 and 38 each have the same (or at least substantially the same) configuration parameters. Such parameters include the number and diameter of coil windings, the coil material, the effective area, the magnetic field to voltage conversion factor and/or voltage gain.

In one or more embodiments, transmitter 34 and receiver 36 or 38 are tilted with respect to the tool axis in orientation by an angle larger than 0 degrees up to 90 degrees. Such a tilted, cross-component or otherwise non-axial arrangement allows for azimuthal resistivity measurements such as azimuthal propagation resistivity measurements, azimuthal induction resistivity measurements, or azimuthal galvanic resistivity measurements of the surrounding formation, providing the signal sources or receivers do have an at least partially directional sensitivity. The measured signals vary depending on the position and orientation of signal source such as a transmitter and a receiver relative to bed boundaries. Such an arrangement allows for determination of azimuthal information such as but not limited to distance to a boundary, direction of the boundary, anisotropy, and dip.

Figure 23:
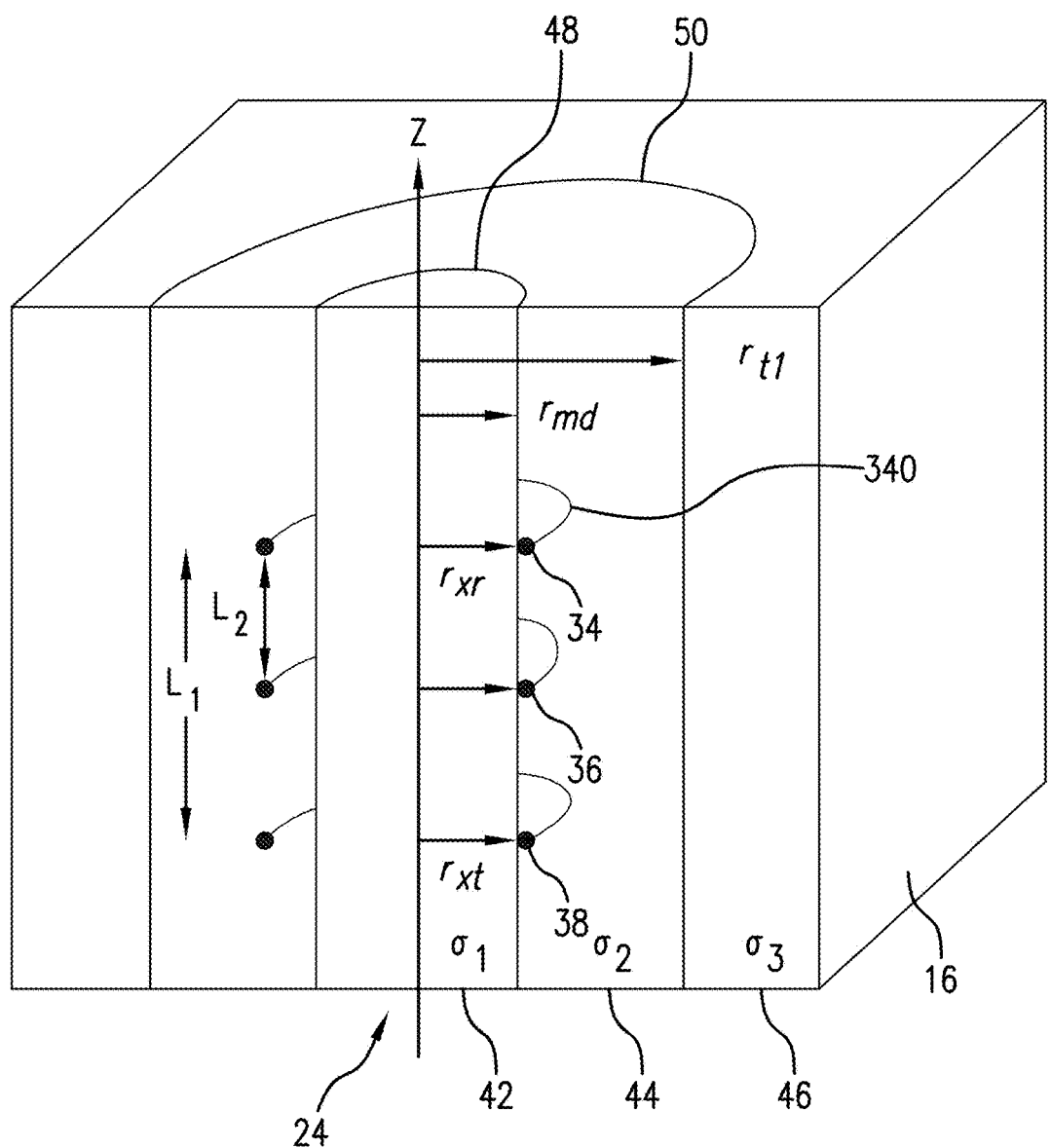
FIG. 23 depicts a structure representing an example configuration of the downhole tool of FIG. 22 in an earth formation.

FIG. 23 shows an exemplary structure representing a configuration of the tool 24 within the formation 16. The structure includes a first zone 42 substantially defined by a metal drill collar, pipe or other conductive carrier with conductivity $\sigma_1$, a transition layer 44 having a conductivity $\sigma_2$, and a remote formation layer 46 having a conductivity $\sigma_3$. The magnetic permeability of the entire space is $\mu$. As illustrated, the boundary 48 separating the metal carrier from the transition layer and the boundary 50 separating the regions of transition layer and remote formation share a common Z-axis. As measured from the Z-axis, the radius of boundary 48 is labeled as $r_{md}$, and the radius of boundary 50 is labeled as $r_{tl}$. An electromagnetic field is excited by the transmitter current loop 340 due to the transmitter 34 positioned at radius, $r_{xt}$, and is measured by the receivers 36 and 38 positioned at radius $r_{xr}$.

Figure 26:
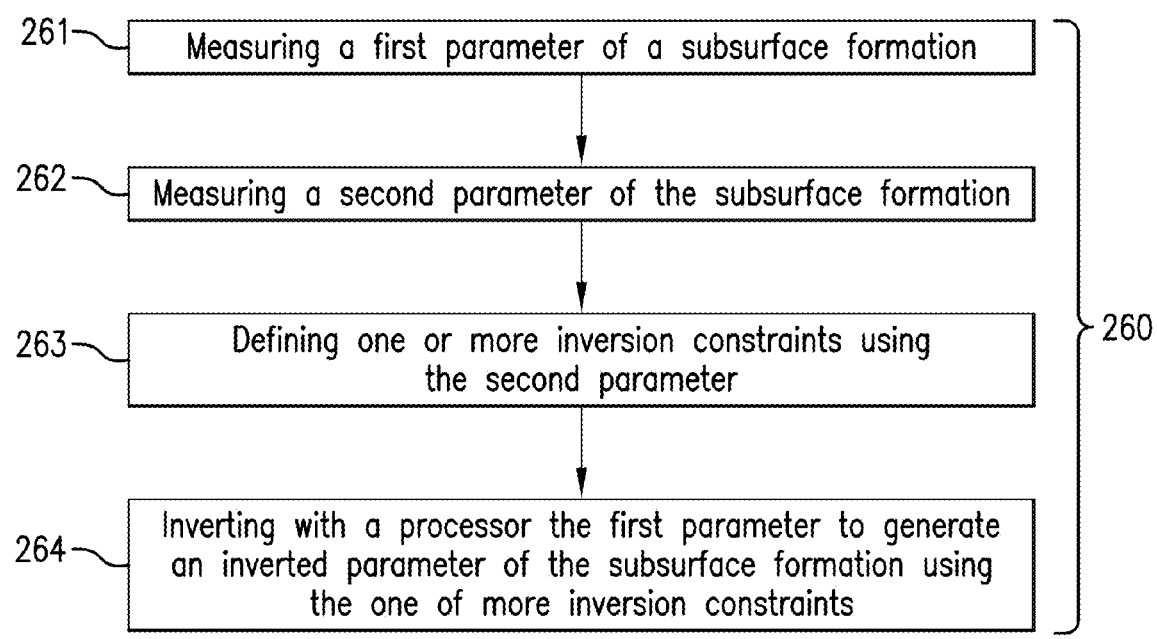
FIG. 26 is a flow chart for a method for estimating an inverted parameter of a subsurface formation.

FIG. 26 is a flow chart for a method 260 for estimating an inverted parameter of a subsurface formation. Block 261 calls for measuring a first parameter of the subsurface formation. In one or more embodiments, the first parameter is measured in a high-angle well. For example, the first parameter of the subsurface formation may be measured in a formation where the relative dip between the direction perpendicular to a formation bed boundary and the well trajectory is larger than 45 degrees. For example, the first parameter of the subsurface formation may be measured in a formation where the relative dip between the direction perpendicular to a formation bed boundary and the well trajectory is larger than 60 degrees. Block 262 calls for measuring a second parameter of the subsurface formation. The second parameter is different from the first parameter. In one or more embodiments, the second parameter is related to at least one of a dip between the borehole and a geological feature of the subsurface formation, a bed boundary in the subsurface formation, or a fluid contact in the subsurface formation. In one or more embodiments, a dipmeter or an imaging tool such as an electric imaging tool, a resistivity imaging tool such as an azimuthal imaging tool, a conductivity imaging tool, a permittivity imaging tool, a gamma radiation imaging tool, a density imaging tool, a porosity imaging tool, and an acoustic imaging tool, such as an acoustic deep compressional or shear wave imaging tool, is used to measure at least one of the first parameter and the second parameter such as the dip between the borehole and a geological feature of the subsurface formation, a bed boundary in the subsurface formation, or a fluid contact in the subsurface formation. In one or more embodiments, at least one of the first and second parameters is at least one of a resistivity, a conductivity, a permittivity, a density, a porosity, a saturation, a gamma radiation, an acoustic wave velocity, a travel time, an arrival time of an acoustic wave, an attenuation of a signal, and a phase difference of a signal. Sensors to measure the first or second parameter may have an omni-directional or a directional characteristic. For instance, if the parameter that is to be measured is a resistivity, the sensor may be configured to measure a bulk resistivity, i.e. the resistivity sensor may have an omni-directional characteristic or the sensor may be configured to measure an azimuthal resistivity such as a deep azimuthal resistivity, a shallow azimuthal resistivity, or a resistivity image. In the latter case, the sensor has a directional characteristic and is rotated within the borehole or the sensor may have a directional characteristic that is rotated within the borehole. In one or more embodiments, at least one of the first parameter and the second parameter may be measured downhole using a downhole tool disposed in a borehole penetrating the subsurface formation. In one or more embodiments, a first tool is configured to measure a first parameter of the subsurface formation and a second tool is configured to measure a second parameter of the subsurface formation. In one or more embodiments, the first tool and the second tool are combined into one tool.

Block 263 calls for defining one or more inversion constraints using the second parameter. A processor may be used in conjunction with the defining. Block 264 calls for inverting with a processor the first parameter to generate the inverted parameter of the subsurface formation using the one or more inversion constraints. In one or more embodiments, the inverted parameter of the subsurface formation comprises one or more bed boundary positions. In one or more embodiments, the inverted parameter of the subsurface formation comprises one of a water saturation, a porosity, and a permeability.

The method 260 may also include defining at least one allowed value for the inverted parameter and the constraint comprises a limitation for the inverted value of the first parameter. For example, a high gamma content of a formation layer that is logged in a gamma ray log may be used to constrain the resistivity of the formation layer. As another example, an allowed resistivity value of a formation that is derived by inverting a porosity log may be limited by a maximum or minimum value that is assumed for the water saturation during the inversion. The maximum and/or minimum value can be used as boundaries of the allowed resistivity values during the inversion. Alternatively, the maximum and/or minimum value can be used to define a range and/or a starting value for the allowed values of the resistivity during the inversion.

The method 260 may also include updating a model of the subsurface formation using the inverted parameter. Values of the inverted parameter may be assigned to various locations in the model. Non-limiting embodiments of the model include a mathematical model (one dimensional, two dimensional, and/or three dimensional), a map, and a physical model. A mathematical model may comprise one or more of at least one analytical equation and at least one differential equation. The mathematical model may be solved, calculated, processed or otherwise treated by one or more of an analytical method, a finite difference method, a finite element method, a finite volume method or other methods known in the art to solve differential equations. The model may be at least partially visualized on a computer screen, a paper, or similar display device.

The method 260 may also include drilling a borehole penetrating the subsurface formation using a drilling system. In one or more embodiments, the drilling system may include a drill tubular such as a drill string. In one or more embodiments, one or more downhole tools for measuring the first parameter and/or the second parameter may be disposed on the drill tubular. In one or more embodiments, a first tool configured to measure a first parameter of the subsurface formation and a second tool configured to measure a second parameter of the subsurface formation. In one or more embodiments, the inverting to generate the inverted parameter is performed while the borehole is being drilled.

The method 260 may also include performing a subsurface-related action in response to the generated inverted parameter. In one or more embodiments, the subsurface-related action may include adjusting an operational parameter in response to obtaining the inverted parameter while the borehole is being drilled. For example, a steering direction or a steering force may be altered in response to obtaining the inverted parameter. As other examples, a mud composition may be adjusted, a telemetry scheme may be altered, or a piece of equipment may be installed or exchanged, or a rate of penetration, a weight on bit, or a rotational velocity, may be altered. As another example, the drilling process may be terminated and the drilling equipment may be removed from the borehole in response to obtaining the inverted parameter. In one or more embodiments, the operational parameter is controlled by a controller.

Set forth below are some embodiments of the foregoing disclosure:

Embodiment 1

A method for estimating an inverted parameter of a subsurface formation, the method comprising: measuring a first parameter of the subsurface formation; measuring a second parameter of the subsurface formation; defining one or more inversion constraints using the second parameter; and inverting with a processor the first parameter to generate the inverted parameter of the subsurface formation using the one or more inversion constraints.

Embodiment 2

The method according to any prior embodiment, wherein the second parameter is related to at least one of a dip between the borehole and a geological feature of the subsurface formation, a fluid contact and a bed boundary.

Embodiment 3

The method according to any prior embodiment, further comprising using at least one of an electric imaging tool, a dipmeter, a resistivity imaging tool, a conductivity imaging tool, a permittivity imaging tool, a gamma radiation imaging tool, a density imaging tool, a porosity imaging tool, an acoustic imaging tool, an acoustic deep compressional or shear wave imaging tool, and an azimuthal resistivity tool to determine the second parameter.

Embodiment 4

The method according to any prior embodiment, wherein at least one of the first parameter and the second parameter is measured downhole using a downhole tool.

Embodiment 5

The method according to any prior embodiment, further comprising drilling a borehole penetrating the subsurface formation, wherein the inverting is performed while the borehole is being drilled.

Embodiment 6

The method according to any prior embodiment, further comprising performing a subsurface-related action in response to the generated inverted parameter.

Embodiment 7

The method according to any prior embodiment, further comprising drilling a borehole penetrating the subsurface formation, wherein the subsurface-related action comprises adjusting an operational parameter in response to obtaining the inverted parameter.

Embodiment 8

The method according to any prior embodiment, wherein the first parameter is measured in a high angle well.

Embodiment 9

The method according to any prior embodiment, wherein at least one of the first and second parameters is at least one of a resistivity, a conductivity, a permittivity, a density, a porosity, a saturation, a gamma radiation, an acoustic wave velocity, a travel time, an arrival time of an acoustic wave, an attenuation of a signal, and a phase difference of a signal.

Embodiment 10

The method according to any prior embodiment, wherein the inverted parameter of the subsurface formation comprises one or more bed boundary positions.

Embodiment 11

The method according to any prior embodiment, wherein the inverted parameter of the subsurface formation comprises one of a water saturation, a porosity, and a permeability.

Embodiment 12

The method according to any prior embodiment, further comprising defining at least one allowed value for the inverted parameter and the constraint comprises a limitation for the allowed value of the inverted parameter.

Embodiment 13

The method according to any prior embodiment, further comprising updating a model of the subsurface formation using the inverted parameter.

Embodiment 14

An apparatus for estimating an inverted parameter of a subsurface formation, the apparatus comprising: a first tool configured to measure a first parameter of the subsurface formation; a second tool configured to measure a second parameter of the subsurface formation; and a processor configured to: invert, using one or more inversion constraints related to the second parameter, the first parameter to generate the inverted parameter of the subsurface formation.

Embodiment 15

The apparatus according to any prior embodiment, further comprising a drill tubular configured to drill a borehole penetrating the subsurface formation, wherein at least one of the first tool and the second tool is disposed on the drill tubular.

Embodiment 16

The apparatus according to any prior embodiment, wherein the processor is further configured to invert the first parameter while the borehole is being drilled.

Embodiment 17

The apparatus according to any prior embodiment, wherein the first tool and the second tool are combined into one tool.

Embodiment 18

The apparatus according to any prior embodiment, wherein at least one of the first tool and the second tool comprises at least one of a dipmeter, an electric imaging tool, a resistivity imaging tool, a conductivity imaging tool, a permittivity imaging tool, a gamma radiation imaging tool, a density imaging tool, a porosity imaging tool, an acoustic imaging tool, an acoustic deep compressional or shear wave imaging tool, and an azimuthal resistivity tool.

Embodiment 19

The apparatus according to any prior embodiment, further comprising a subsurface-related action apparatus configured to perform a subsurface-related action using the inverted parameter.

Embodiment 20

The apparatus according to any prior embodiment, wherein the subsurface-related action apparatus comprises a controller configured to adjust an operational parameter of a drilling system configured to drill a borehole penetrating the subsurface in response to obtaining the inverted parameter.

In support of the teachings herein, various analysis components may be used, including a digital and/or an analog system. For example, the downhole tool 24, the downhole processor 26, and/or the surface processing unit 28 may include digital and/or analog systems. The system may have components such as a processor, storage media, memory, input, output, communications link (wired, wireless, optical or other), user interfaces (e.g., a display or printer), software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" and the like are intended to be inclusive such that there may be additional elements other than the elements listed. The conjunction "or" when used with a list of at least two terms is intended to mean any term or combination of terms. The term "configured" relates one or more structural limitations of a device that are required for the device to perform the function or operation for which the device is configured. The terms "first," "second," and the like do not denote a particular order, but are used to distinguish different elements.

The flow diagram depicted herein is just an example. There may be many variations to this diagram or the steps (or operations) described therein without departing from the spirit of the invention. For instance, the steps may be performed in a differing order, or steps may be added, deleted or modified. All of these variations are considered a part of the claimed invention.

The disclosure illustratively disclosed herein may be practiced in the absence of any element which is not specifically disclosed herein.

While one or more embodiments have been shown and described, modifications and substitutions may be made thereto without departing from the spirit and scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for estimating an inverted parameter of a subsurface formation, the method comprising:
    drilling a borehole penetrating the subsurface formation;
    measuring a first parameter of the subsurface formation;
    measuring a second parameter of the subsurface formation;
    modeling the first parameter by a model, the model comprising a model parameter;
    defining one or more inversion constraints using the second parameter, the one or more inversion constraints comprising a limitation for the model parameter; and
    resolving, with a processor, the model parameter from the first parameter by inverting with the processor the first parameter to generate the inverted parameter of the subsurface formation using the one or more inversion constraints.

2. The method according to claim 1, wherein the second parameter is related to at least one of a dip between the borehole and a geological feature of the subsurface formation, a fluid contact and a bed boundary.

3. The method according to claim 2, further comprising using at least one of an electric imaging tool, a dipmeter, a resistivity imaging tool, a conductivity imaging tool, a permittivity imaging tool, a gamma radiation imaging tool, a density imaging tool, a porosity imaging tool, an acoustic imaging tool, an acoustic deep compressional or shear wave imaging tool, and an azimuthal resistivity tool to determine the second parameter.

4. The method according to claim 2, wherein at least one of the first parameter and the second parameter is measured downhole using a downhole tool.

5. The method according to claim 1, wherein the inverting is performed while the borehole is being drilled.

6. The method according to claim 1, further comprising performing a subsurface-related action in response to the inverted parameter.

7. The method according to claim 6, wherein the subsurface-related action comprises adjusting an operational parameter in response to the inverted parameter.

8. The method according to claim 1, wherein the first parameter is measured in a high angle well.

9. The method according to claim 1, wherein at least one of the first and second parameters is at least one of a resistivity, a conductivity, a permittivity, a density, a porosity, a saturation, a gamma radiation, an acoustic wave velocity, a travel time, an arrival time of an acoustic wave, an attenuation of a signal, and a phase difference of a signal.

10. The method according to claim 1, wherein the inverted parameter of the subsurface formation comprises one or more bed boundary positions.

11. The method according to claim 1, wherein the inverted parameter of the subsurface formation comprises one of a water saturation, a porosity, and a permeability.

12. The method according to claim 1, further comprising defining at least one allowed value for the inverted parameter and the one or more inversion constraints comprises a limitation for the allowed value of the inverted parameter.

13. The method according to claim 1, further comprising updating a model of the subsurface formation using the inverted parameter.

14. An apparatus for estimating an inverted parameter of a subsurface formation, the apparatus comprising:
    a drilling system configured to drill a borehole penetrating the subsurface formation;
    a first tool disposed in the drilling system and configured to measure a first parameter of the subsurface formation;
    a second tool disposed in the drilling system and configured to measure a second parameter of the subsurface formation; and
    a processor configured to:
        model the first parameter by a model, the model comprising a model parameter; and
        resolve the model parameter from the first parameter by inverting, using one or more inversion constraints related to the second parameter, the first parameter to generate the inverted parameter of the subsurface formation;
    wherein the one or more inversion constraints comprise a limitation for the model parameter.

15. The apparatus according to claim 14, wherein the second parameter is related to at least one of a dip between the borehole and a geologic feature of the subsurface formation, a fluid contact and a bed boundary.

16. The apparatus according to claim 15, wherein the processor is further configured to invert the first parameter while the borehole is being drilled.

17. The apparatus according to claim 14, wherein the first tool and the second tool are combined into one tool.

18. The apparatus according to claim 14, wherein at least one of the first tool and the second tool comprises at least one of a dipmeter, an electric imaging tool, a resistivity imaging tool, a conductivity imaging tool, a permittivity imaging tool, a gamma radiation imaging tool, a density imaging tool, a porosity imaging tool, an acoustic imaging tool, an acoustic deep compressional or shear wave imaging tool, and an azimuthal resistivity tool.

19. The apparatus according to claim 14, further comprising a subsurface-related action apparatus configured to perform a subsurface-related action using the inverted parameter.

20. The apparatus according to claim 19, wherein the subsurface-related action apparatus comprises a controller configured to adjust an operational parameter in response to obtaining the inverted parameter.

* * * * *